United States Patent [19]

Kusaka

[11] Patent Number: 5,434,639
[45] Date of Patent: Jul. 18, 1995

[54] FOCUS DETECTION APPARATUS
[75] Inventor: Yosuke Kusaka, Yokohama, Japan
[73] Assignee: Nikon Corporation, Tokyo, Japan
[21] Appl. No.: 337,514
[22] Filed: Nov. 8, 1994

Related U.S. Application Data

[63] Continuation of Ser. No. 74,732, Jun. 10, 1993, which is a continuation of Ser. No. 845,182, Mar. 3, 1992, abandoned.

[30] Foreign Application Priority Data

Mar. 6, 1991 [JP]  Japan .................. 3-065593
Mar. 6, 1991 [JP]  Japan .................. 3-065594

[51] Int. Cl.⁶ .............................. G03B 13/36
[52] U.S. Cl. .................................. 354/408
[58] Field of Search ............ 354/402, 403, 406, 407, 354/408

[56] References Cited

U.S. PATENT DOCUMENTS 4,373,791  2/1983  Araki ..................... 354/402
4,768,052  8/1988  Hamada et al. ........... 354/406 X
4,949,116  8/1990  Karasaki et al. ......... 354/408
4,982,219  1/1991  Uchiyama ............... 354/408
5,029,998  7/1991  Utagawa et al. ......... 354/402
5,160,834  11/1992  Moriyama ............. 354/408 X

FOREIGN PATENT DOCUMENTS 2-50115  2/1990  Japan .

Primary Examiner—Russell E. Adams
Attorney, Agent, or Firm—Shapiro and Shapiro

[57] ABSTRACT

Focus detection apparatus employs a plurality of focus detection areas, particularly cross type focus detection areas having two strip type focus detection areas which intersect at right angles in a photographing image plane. Embodiments of the invention make use of focus detection areas that vary in location, arrangement, orientation, alignment, and length. Photoelectric converters employ arrays of pixels with different pixel pitches and/or pixel widths and with different slant angles of pixels relative to a longitudinal dimension of the arrays.

20 Claims, 19 Drawing Sheets

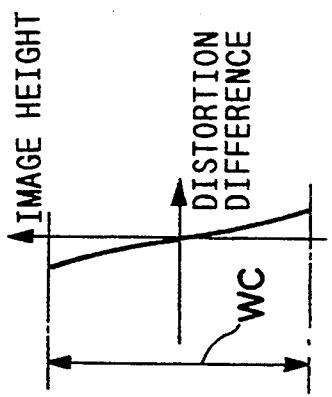
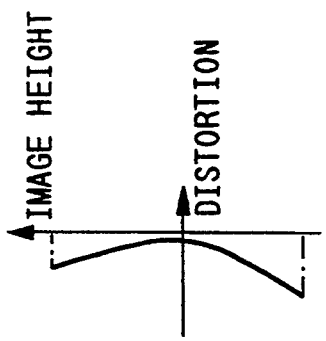
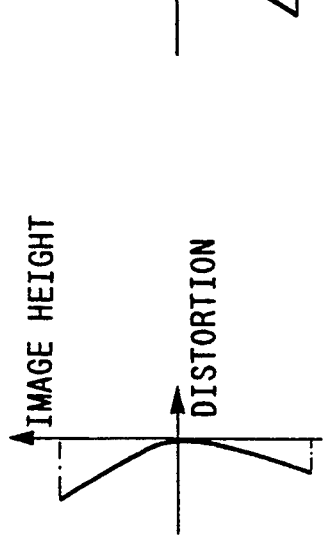
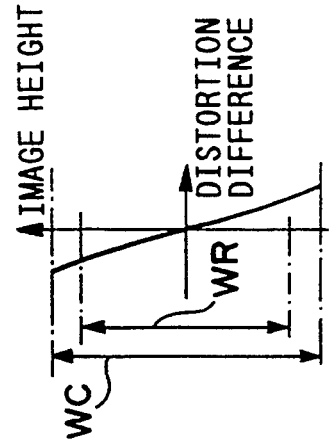
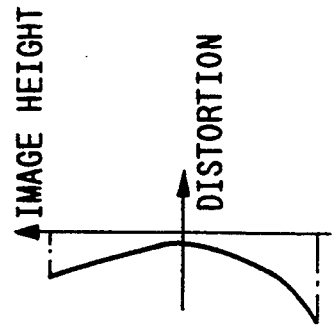
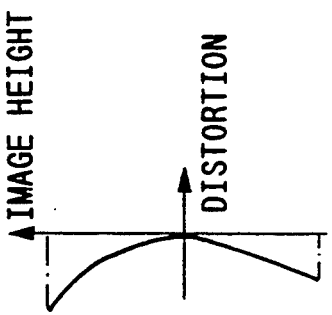

FOCUS DETECTION APPARATUS

This is a continuation of application Ser. No. 08/074,732, filed Jun. 10, 1993, which is a continuation of application Ser. No. 07/854,182, filed Mar. 3, 1992, both abandoned.

BACKGROUND OF THE INVENTION

1. Field of the Invention

The present invention relates to a focus detection apparatus having a plurality of focus detection areas.

2. Related Background Art

Traditionally, there has been known a focus detection apparatus having a plurality of focus detection areas in a photographing image plane, which is capable of detecting the focus detection state of its photographing optical system on the basis of the output signals from a plurality of light receiving portions for each of these focus detection areas (as disclosed in Japanese Patent Application Laid-Open No. 2-50115, for example).

The arrangements of the focus detection area of a focus detection apparatus of the kind are illustrated in FIG. 1A and FIG. 1B.

At first in FIG. 1A, there are arranged on a straight line in the longer side direction of the photographing image plane P, three cross type focus detection areas (hereinafter referred to as cross type focus detection area) with two strip type focus detection areas (hereinafter referred to simply as focus detection area) set in the direction rectangular to each other in a photographing image plane P and the cross type focus detection area located in the center of the image plane is set in the center of the photographing image plane P. Further, one of the focus detection areas included in each of the cross type focus detection areas is set in parallel with the longer side direction of the photographing image plane P. Naturally, therefore, the other one of the focus detection areas is arranged in parallel with the shorter side direction of the photographing image plane P.

Next, in FIG. 1B, three cross type focus detection areas are arranged on one straight line in the diagonal direction of the image plane in the photographing image plane P with the cross type focus detection area in the center of the image plane being set in the center of the photographing image plane P. Further, one of focus detection areas included in each of the cross type focus detection areas is set in parallel with the longer side direction of the image plane. Naturally, therefore, the other one of the focus detection areas is arranged in parallel with the shorter side direction of the photographing image plane P.

However, for the above-mentioned conventional focus detection apparatus, there are problems set forth below.

(1) The focus detection areas included respectively in the plural cross type focus detection areas are set in parallel with each other in the conventional apparatus. Therefore, when an object having an edge or line inclined at an angle of almost 45 degrees to each of the focus detection areas is complemented as shown in FIG. 2A and FIG. 2B, the focus detection becomes disabled, resulting in the degradation of the focus detection precision.

(2) When a portrait photograph is taken, the face of an object person where the focusing is desired is positioned slightly out of the center of the photographing image plane as shown in FIG. 3A and FIG. 3B. However, if the cross type focus detection area is set in the center of the image plane, the focus point on the chest portion of the object person is detected and the face is not focused. Yet it is difficult from the viewpoint of the focus detection optical system to set the other cross type focus detection area in a higher place where the face of a person is possibly positioned in taking a portrait photograph while setting one cross type focus detection area in the center of the image plane.

(3) In a conventional apparatus in which a plurality of the cross type focus detection areas are arranged on one straight line, there is also a possibility that the focus detections become disabled in all of the cross type focus detection areas depending on the photographing compositions in an object having horizontal and vertical patterns often existing in the natural world as shown in FIG. 4A or an object with slanting patterns as shown in FIG. 4B. In order to avoid this, it is necessary to set a plurality of focus detection areas so that they are not arranged in one straight line in the photographing image plane. However, this necessitates making the chip size of the photoelectric conversion sensor larger. Hence leading to an increased manufacturing cost.

(4) For the cross type focus detection areas set in the locations other than the center of the photographing image plane, the length of each of the focus detection areas is not defined in consideration of the asymmetry of the focus detection optical system with respect to the optical axis of the photographing optical system. Therefore, depending on an object, the precision of the focus detection is lowered. The detailed description will be given in this respect.

(5) In a focus detection optical system in which the focus detection areas are set in the center of the image plane and other locations, the flexibility in designing the optical system is restrained in the vicinity of the optical axis and locations away from the optical axis of the focus detection optical system because of the integrated formation of the condenser lens and separator lens. Usually, a priority is given to the precision of the focus detection in the center of the image plane. Accordingly, the performance of the focus detection optical system is inferior to the performance thereof in the vicinity of the optical axis. Also, the focus detection optical system is asymmetrical to the plane including the optical axis of the photographing optical system, and a pair of the secondary object images refocused by the focus detection optical system are also asymmetrical. In consideration of these aspects, the pixel pitches, pixel width, pixel slanting direction, and slanting angles of the light receiving portions of the photoelectric conversion sensor are not defined in the conventional focus detection apparatus. Hence lowering the focus detection precision in the focus detection areas other than the center of the image plane.

Now, the detailed descriptions will be given below as to the above-mentioned item (4) and item (5).

FIG. 5 illustrates a setting example of the three focus detection areas while FIG. 6 illustrates a focus detection system for which the three focus detection areas shown in FIG. 5 have been set.

At first, in FIG. 5, reference marks ACH, ALH, and ARH designate the strip type focus detection areas respectively and are set in the center of the photographing image plane P and other locations therein on one straight line in the longer side direction of the image plane.

Next, in FIG. 6, a reference mark MSK designates a viewing mask arranged in the vicinity of the expected image formation plane of the photographing optical system, and by the openings on the viewing mask MSK, each of the focus detection areas ACH, ALH, and ARH shown in FIG. 5 is formed, and FR, FC, FL designate condenser lenses respectively for the focus detection areas ARH, ACH, and ALH. Reference marks SRH1, SRH2, SCH1, SCH2, SLH1, and SLH2 designate separator lenses, and the separator lenses SRH1 and SRH2, SCH1 and SCH2, and SLH1 and SLH2 form the respective pairs for each of the focus detection areas ARH, ACH, and ALH. Further, a reference mark SNS designates a sensor for performing the photoelectric conversion; EH1 and EH2, the pupil areas of a photographing optical system which is not shown; and AX, the optical axis of a photographing optical system.

The primary image of an object formed on the focus detention areas ARH, ACH, ALH through the pupil area EH1 of the photographing optical system is refocused as three secondary objective images on the sensor SNS through the condenser lenses FR, FC, and FL and the separator lenses SRH1, SCH1, and SLH1. Also, the primary image of an object formed on the focus detection areas ARH, ACH, ALH through the pupil area EH2 of the photographing optical system is refocused as three secondary objective images on the sensor SNS through the condenser lenses FR, FC, and FL and the separator lenses SRH2, SCH2, and SLH2.

The deviated amount of the pair of the secondary objective images refocused on the sensor SNS is detected for the detection of a focus adjustment condition of the photographing optical system. However, in the pair of the secondary objective images refocused by the focus detection optical system, there exists an image deviation amount occurring due to the nonfocusing condition of the photographing optical system and an image deviation amount occurring due to the asymmetrical arrangement of the focus detection optical system to the optical axis AX of the photographing optical system. In other words, the focus detection areas set further away from the center of the image plane where the optical axis AX of the photographing optical system runs are more affected by the focus detection system which is asymmetrically arranged with respect to the optical axis AX.

FIGS. 7A, 7B and 7C show the image heights and distortions when the primary image of the object formed on the focus detection area ACH in the center of the image plane shown in FIG. 5 is refocused by the focus detection optical system shown in FIG. 6 on the sensor SNS as a pair of the secondary objective images. FIG. 7A shows the image height and distortion of the secondary objective image refocused by the separator lens SCH1. FIG. 7B shows the image height and distortion of the secondary objective image refocused by the separator lens SCH2. FIG. 7C shows the distortion difference between the pair shown in FIGS. 7A and 7B.

Also, FIGS. 8A, 8B and 8C show the image heights and distortions when the primary image of the object formed on the focus detection areas ALH and ARH, which are positioned in the locations other than the center of the image plane shown in FIG. 5, is refocused by the focus detection optical system shown in FIG. 6 on the sensor SNS as a pair of the secondary objective images. FIG. 8A shows the image height and distortion of the secondary objective image refocused by the separator lens SLH1 or SRH1. FIG. 8B shows the image height and distortion of the secondary objective image refocused by the separator lens SLH2 or SRH2. FIG. 8C shows the distortion difference between the pair shown in FIGS. 8A and 8B.

The distortion difference which presents a problem when the image deviation amount of the secondary objective image is detected for the focus detection is greater in the distortion difference in the focus detection areas ALH and ARH shown in FIG. 8C which are positioned in the locations other than the center of the image plane than the distortion difference in the focus detection area ACH defined in the center of the image plane as in FIG. 7C. In order to obtain the same focus detection precision in the center of the image plane in the detection areas which are positioned in the locations other than the center of the image plane, it is necessary to make the length of the focus detection area ALH and ARH in the locations other than the center of the image plane to be a length WR which is shorter than the length WC of the central focus detection area ACH as shown in FIG. 8C.

Also, as shown in FIG. 9, if the focus detection areas ALV and ARV are set in the direction toward the contacting line of the center of the image plane and the concentric circles even in the focus detection areas in the locations other than the center of the image plane, the asymmetry of the focus detection optical system is modified better than the focus detection areas ALH and ARH defined in the radial directions from the center of the image plane as shown in FIG. 5 although it is still inferior to the distortion difference between the pair of the secondary objective images in the focus detection area ACH set in the center of the image plane. Accordingly, the difference becomes smaller than the distortion difference in the focus detection areas ALV and ARH. As a result, the length of the focus detection areas ALV and ARV can be set longer than the focus detection areas ALH and ARH so as to enable focus detections in a wide range.

FIG. 10 illustrates a focus detection optical system in which the cross type focus detection areas are set in the center of the photographing image plane P and in the locations other than the center thereof. In this respect, the same reference marks are given to the same elements of the focus detection optical system shown in FIG. 6, and the description will be made mostly of the points which differ therefrom. Also, the focus detection area set on the right-hand side of FIG. 10 is symmetrical to the optical axis AX of the photographing optical system. Accordingly, the description will be centered on the focus detection area ALH and ALV set on the left-hand side of FIG. 10.

In FIG. 10, a reference mark FL designates a condenser lens; RX, a diaphragm mask; and RLH1, RLH2, RLV1 and RLV2, the openings of the diaphragm mask RX. The diaphragm mask openings RLH1 and RLH2, and RLV1 and RLV2 form pairs respectively, and the focus detection areas ALH and ALV are respectively set therefor. Reference marks SLH1, SLH2, SLV1 and SLV2 designate separator lenses, and the SLH1 and SLH2, and SLV1 and SLV2 form pairs respectively. The diaphragm mask openings RLH1 and RLH2, and RLV1 and RLV2 are set respectively therefor. Further, reference marks PLH1, PLH2, PLV1 and PLV2 designate the light receiving portions arranged on the sensor SNS for each of the focus detection areas ALH and ALV.

The primary image of an object formed on the focus detection area ALH through the pupil areas EH1 and EH2 of the photographing optical system is refocused on the light receiving portions PLH1 and PLH2 on the sensor SNS as the secondary objective images through the condenser lens FL, diaphragm mask openings RLH1 and RLH2 and separator lenses SLH1 and SLH2. Also, the primary image of an object formed on the focus detection area ALV through the pupil areas EV1 and EV2 of the photographing optical system is refocused on the light receiving portions PLV1 and PLV2 of the sensor SNS as the secondary objective images through the condenser lens FL, diaphragm mask openings RLV1 and RLV2 and separator lenses SLV1 and SLV2. In other words, for the focus detection for the focus detection area ALH set in the radial directions form the center of the image plane in the locations other than the center of the image plane, a light beam passing through the exit pupil areas EH1 and EH2 of the photographing optical system is used. On the other hand, for the focus detection for the focus detection area ALV set in the direction of the contacting line of the center of the image plane and the concentric circles in the locations other than the center of the image plane, a light beam passing through the exit pupil areas EV1 and EV2 of the photographing optical system is used. In this respect, the light beam reaching the points other than the center of the image plane is caused to restrain its light beam not only by the diaphragm of the photographing optical system, but also by the outer diameter of the hood and lens and others.

FIG. 11 shows a substantial shape of the pupil aperture EX viewed from the focus detection areas ALH and ALV set in the locations other than the center of the image plane to the lens side.

As shown in FIG. 11, the aperature is not a circle in the locations other than the center of the image plane and the exit pupil areas EH1, EH2, EV1, and EV2 are set therein. The pupil areas EV1 and EV2 for the focus detection area ALV set in the contacting line of the center of the image plane and concentric circles in the locations other than the center of the image plane are the symmetrical areas to the pupil aperture shape EX. Thus, the light beams having passed these areas have almost the same aberration characteristics. Therefore, the pair of the secondary objective images formed by these light beams are symmetrical, and are suitable for the focus detection. On the other hand, the pupil areas EH1 and EH2 for the focus detection area ALH set in the radial directions from the center of the image plane in the locations other than the center of the image plane are asymmetrical areas to the pupil aperture shape EX. Thus, the light beams having passed these areas have different aberration characteristics. As a result, the secondary objective images formed by these light beams lose their symmetry, and if a focus detection is performed using the secondary objective images in the locations away from the center of the focus detection area ALH, the focus detection error becomes great as described above.

Thus, when the focus detection areas are set in the locations other than the center of the photographing image plane, the length of those focus detection areas should be made shorter than the length of the focus detection area set in the center of the image plane, and further, the length of the focus detection areas set in the radial directions from the center of the image plane should be made shorter than the length of the focus detection area set in the direction of the contacting line of the center of the image plane and concentric circles for performing focus detection, so that the focus detection error should be minimized.

SUMMARY OF THE INVENTION

It is an object of the present invention to provide a focus detection apparatus capable of detecting focus assuredly for an object irrespective of the photographing compositions by setting the focus detection areas efficiently in the photographing image plane.

Now, the present invention will be described in conjunction with FIG. 12A which illustrates an embodiment thereof. Here, an embodiment according to the present invention is applicable to a focus detection apparatus which is provided with a photoelectric converting device to receive through a focus detection system the light beams having passed the cross type focus detection areas having two strip type focus detection areas set to intersect at right angles in the photographing image plane, and a focus detection computing device to detect the focus adjustment conditions of the photographing optical system for each of the strip type focus detection areas on the basis of output signals from the photoelectric converting device. Then, the cross type focus detection areas are set in the center of the photographing image plane P and in the locations other than the center thereof, and further, each of the strip type focus detection areas included in the cross type focus detection areas ALX1, ALX2 and ARX1 and ARX2 set in the locations other than the center of the photographing image plane P is set so as not to be in parallel with each of the strip type focus detection areas included in the cross type focus detection areas ACH and ACV set in the center of the photographing image plane P. Hence achieving the above-mentioned object of the present invention.

In the present embodiment, the cross type focus detection areas having two strip type focus detection areas arranged to intersect at right angles are set in the center of the photographing image plane P and in the locations other than the center thereof and at the same time, each of the strip type focus detection areas included in the cross type focus detection areas ALX1 and ALX2, and ARX1 and ARX2 in the locations other than the center of the image plane are set so as not to be in parallel with each of the strip type focus detection areas included in the cross type focus detection areas ACH and ACV in the center. Thus, based on the output signals from the photoelectric converting device which receives the light beams having passed through these cross type focus detection areas through a focus detection optical system, the focus adjustment condition of the photographing optical system is detected by a focus detection computing device for each of the strip type focus detection areas.

Now, the present invention will be described in conjunction with FIG. 16 which illustrates an embodiment thereof. Here, an embodiment according to the present invention is applicable to a focus detection apparatus which is provided with a photoelectric converting device to receive through a focus detection system the light beams having passed through the cross type focus detection areas having two strip type focus detection areas set to intersect at right angles in the photographing image plane, and a focus detection computing device to detect the focus adjustment conditions of the photographing optical system for each of the strip type focus detection areas on the basis of output signals from the photoelectric converting device. Then, in the photographing image plane P, a plurality of cross type focus detection areas (ACH and ACV, ALX1 and ALX2, and ARX1 and ARX2) are set in such a manner that each of the strip type focus detection areas included in at least two cross type focus detection areas are not to be in parallel with each other. Hence achieving the above-mentioned object of the present invention.

In the present embodiment, a plurality of cross type focus detection areas (ACH and ACV, ALX1 and ALX2, and ARX1 and ARX2) having two strip type focus detection areas arranged to intersect at right angles are set in the the photographing image plane P and at the same time, each of the strip type focus detection areas included in at least two cross type focus detection areas of these cross type focus detection areas are set to be not in parallel with each other. Thus, based on the output signals from the photoelectric converting device which receives the light beams having passed these cross type focus detection areas through a focus detection optical system, the focus adjustment condition of the photographing optical system is detected by a focus detection computing device for each of the strip type focus detection areas.

Now, the present invention will be described in conjunction with FIG. 32A which illustrates an embodiment thereof. Here, an embodiment according to the present invention is applicable to a focus detection apparatus which is provided with a photoelectric converting device to receive through a focus detection system the light beams having passed two cross type focus detection areas set to intersect at right angles in the photographing image plane, and a focus detection computing device to detect the focus adjustment conditions of the photographing optical system for each of the strip type focus detection areas on the basis of output signals from the photoelectric converting device. Then, in the photographing image plane P, three or more cross type focus detection areas (ACH and ACV, ALH and ALV, and ARH and ARV) are set in such a manner that these cross type focus detection areas are not arranged on one straight line. Hence achieving the above-mentioned object of the present invention.

In the present embodiment, three or more cross type focus detection areas (ACH and ACV, ALH and ALV and ARH and ARV) having two strip type focus detection areas arranged to intersect at right angles are set in the the photographing image plane P and at the same time, these cross type focus detection areas are set in such a manner that they are not arranged on one straight line. Thus, based on the output signals from the photoelectric converting device which receives the light beams having passed these cross type focus detection areas through a focus detection optical system, the focus adjustment condition of the photographing optical system is detected by a focus detection computing device for each of the strip type focus detection areas.

Also, in an embodiment according to the present invention, three or more cross type focus detection areas are set in the locations other than the center of the photographing image plane P.

In the present embodiment, three or more cross type focus detection areas are set in the location other than the center of the photographing image plane P. Then, based on the output signals from the photoelectric converting device which receives the light beams having passed these cross type focus detection areas through a focus detection optical system, the focus adjustment condition of the photographing optical system is detected by a focus detection computing device for each of the strip type focus detection areas.

Now, the present invention will be described in conjunction with FIG. 39 which illustrates an embodiment thereof. Here, an embodiment according to the present invention is applicable to a focus detection apparatus which is provided with a photoelectric converting device to receive through a focus detection system the light beams having passed the cross type focus detection areas having two strip type focus detection areas set to intersect at right angles in the photographing image plane, and a focus detection computing device to detect the focus adjustment conditions of the photographing optical system for each of the strip type focus detection areas on the basis of output signals from the photoelectric converting device. Then, in the photographing image plane P, four or more cross type focus detection areas are set in such a manner that these cross type focus detection areas are on both of the symmetrical lines in the photographing image plane P or on both of the vertical and horizonal center lines in the photographing image plane P. Hence achieving the above-mentioned object of the present invention.

In the present embodiment, four or more cross type focus detection areas having two strip type focus detection areas arranged to intersect at right angles are set in the photographing image plane P and at the same time, these cross type focus detection areas are set in such a manner that they are arranged on both of the symmetrical lines in photographing image plane P or on the both of vertical and horizontal center lines in the photographing image plane P. Thus, based on the output signals from the photo-electric converting device which receives the light beams having passed these cross type focus detection areas through a focus delection optical system, the focus adjustment condition of the photographing optical system is detected by a focus detection computing device for each of the strip type focus detection areas.

Now, the present invention will be described in conjunction with FIG. 42 which illustrates an embodiment thereof. Here, an embodiment according to the present invention is applicable to a focus detection apparatus which is provided with a focus detection optical system to guide onto an photoelectric converting device SNS the light beams having passed a plurality of focus detection areas set in the photographing image plane for the refocusing of the objective images for the respective focus detection areas on the photoelectric converting devices SNS to form a plurality of the secondary objective images, and a focus detection computing device to detect the focus adjustment conditions of the photographing optical system for each of the strip type focus detection areas on the basis of output signals from the photoelectric converting device SNS. Then, in the photographing image plane P, three or more focus detection areas ACH and ACV, ALX1 and ALX2, and ARX1 and ARX2 are set in the photographing image plane in such a manner that the center of each of the focus detention areas is not arranged on one straight line, and the focus detection optical system is caused to refocus the objective images for each of these focus detection areas to arrange the centers of the secondary objective images for each of these focus detection areas substantially on one straight line on the photoelectric converting device SNS. Hence achieving the above-mentioned object of the present invention.

In the present embodiment, three or more focus detection areas ACH and ACV, ALX1 and ALX2, and ARX1 and ARX2 are set in the photographing image plane P in such a manner that the centers of the respective focus detection areas are not arranged on one straight line, and the focus detection optical system caused the objective images for the respective focus detection areas to be refocused on the photoelectric converting device SNS so that the centers of the secondary objective images for each of these focus detection areas are arranged substantially on one straight line on the photoelectric converting device SNS. Then, based on the output signals from the photoelectric converting device SNS, the focus adjustment condition of the photographing optical system is detected by a focus detection computing device for each of the strip type focus detection areas.

In an embodiment according to the present invention, the focus detection optical system is provided with plural pairs of at least condenser lenses FC, FL, and FR and a pair of separator lenses SCH1, SCH2, SCV1, SCV2, SLX11, SLX12, SLX21, SLX22, SRX11, SRX12, SRX21, and SRX22 for each of the focus detection areas, and these plural pairs of condenser lens and pair of separator lenses cause the objective images for the respective focus detection areas to be refocused so that the centers of the secondary objective images for each of the focus detection areas are arranged substantially on one straight line on the photoelectric converting device SNS.

In the present embodiment by plural pairs of condenser lens FC, FL, and FR and a pair of separator lenses SCH1, SCH2, SCV1, SCV2, SLX11, SLX12, SLX21, SLX22, SRX11, SRX12, SRX21 and SRX22, the focus detection optical system causes the objective images for the respective focus detection areas to be refocused so that the centers of the secondary objective images for each of the focus detection areas are arranged substantially on one straight line on the photoelectric converting device SNS.

Now, it is an object of the present invention to provide a focus detection apparatus capable of performing accurate focus detections in the focus detection areas set in the locations other than the center of the photographing image plane.

Now, the present invention will be described in conjunction with FIG. 20 which illustrates an embodiment thereof. Here, an embodiment according to the present invention is applicable to a focus detection apparatus which is provided with a focus detection optical system to guide onto a photoelectric converting device the light beams having passed a plurality of focus detection areas set in the photographing image plane, a photoelectric converting device having plural pairs of light receiving portions formed by a plurality of pixels for each of the focus detection areas to receive the light beams which have passed each of the focus detection areas, and a focus detection computing device to detect the focus adjustment conditions of the photographing optical system for each of the strip type focus detection areas on the basis of output signals from this photoelectric converting device.

Then, the plurality of focus detection areas are set in the center of the photographing image plane and in the locations other than the center thereof, and the pixel pitches and/or pixel widths of a pair of the light receiving portions PCH1 and PCH2, and PCV1 and PCV2 for the focus detection area set in the center of the photographing image plane, and the pixel pitches and/or pixel widths of a pair of the light receiving portions PLH1 and PLH2, and PLV1 and PLV2 for the focus detection area set in the locations other than the center of the photographing image plane are arranged to be relatively different. Hence achieving the above-mentioned object.

In the present embodiment, a plurality of focus detection areas are set in the center of the photographing image plane and in the locations other than the center thereof, and the pixel pitches and/or pixel widths of a pair of the light receiving portions PCH1 and PCH2, and PCV1 and PCV2 for the focus detection area set in the center of the photographing image plane, and the pixel pitches and/or pixel widths of a pair of the light receiving portions PLH1 and PLH2, and PLV1 and PLV2 for the focus detection area set in the locations other than the center of the photographing image plane are arranged to be relatively different. Then, based on the output signals from the photoelectric converting device which receives the light beams having passed these plural focus detection areas through a focus detection optical system, the focus adjustment condition of the photographing optical system is detected by a focus detection computing device for each of the focus detection area.

In an embodiment according to the present invention, the pixel pitches KRLH1, KRLH2, and KRLV of a pair of light receiving portions PLH1 and PLH2, and PLV1 and PLV2 for the focus detection areas set in the locations other than the center of the photographing image plane are defined to be finer than the pixel pitches KCH and KCV of a pair of light receiving portions PCH1 and PCH2, and PCV1 and PCV2 for the focus detection areas set in the center of the photographing image plane.

In the present embodiment, the pixel pitches KRLH1, KRLH2, and KRLV of a pair of light receiving portions PLH1 and PLH2, and PLV1 and PLV2 for the focus detection areas set in the locations other than the center of the photographing image plane are defined to be finer than the pixel pitches KCH and KCV of a pair of light receiving portions PCH1 and PCH2, and PCV1 and PCV2 for the focus detection areas set in the center of the photographing image plane. Then, based on the output signals from the photoelectric converting device which receives the light beams having passed these plural focus detection areas through a focus detection optical system, the focus adjustment condition of the photographing optical system is detected by a focus detection computing device for each of the focus detection area.

Further, an embodiment according to the present invention, the pixel widths HRLH1, HRLH2, and HRLV of a pair of light receiving portions PLH1 and PLH2, and PLV1 and PLV2 for the focus detection areas set in the locations other than the center of the photographing image plane are defined to be wider than the pixel widths HCH and HCV of a pair of light receiving portions PCH1 and PCH2, and PCV1 and PCV2 for the focus detection areas set in the center of the photographing image plane.

In the present embodiment, the pixel widths HRLH1, HRLH2, and HRLV of a pair of light receiving portions PLH1 and PLH2, and PLV1 and PLV2 for the focus detection areas set in the locations other than the center of the photographing image plane are defined to be wider than the pixel widths HCH and HCV of a pair of light receiving portions PCH1 and PCH2, and PCV1 and PCV2 for the focus detection areas set in the center of the photographing image plane. Then, based on the output signals from the photoelectric converting device which receives the light beams having passed these plural focus detection areas through a focus detection optical system, the focus adjustment condition of the photographing optical system is detected by a focus detection computing device for each of the focus detection area.

Now, the present invention will be described in conjunction with FIG. 18 which illustrates an embodiment thereof. Here, an embodiment according to the present invention is applicable to a focus detection apparatus which is provided with a photoelectric converting device to receive through a focus detection optical system the light beams having passed the cross type focus detection areas having two strip type focus detection areas set to intersect at right angles in the photographing image plane P, and a focus detection computing device to detect the focus adjustment conditions of the photographing optical system for each of the strip type focus detection areas on the basis of output signals from this photoelectric converting device.

Then, the cross type focus detection areas ARH and ARV, and ALH and ALV are set in the locations other than the center of the photographing image plane P, and one of the strip type focus detection areas ARH and ALH in the cross type focus detection areas are set in the radial lines from the center of the photographing image plane P and at the same time, the length WRLH of the strip type focus detection areas ARH and ALH set on the radial lines is defined to be shorter than the length WRLV of the strip type focus detection areas ARV and ALV which intersect at right angles with the strip type focus detection areas ARH and ALH. Hence achieving the above-mentioned object.

In the present embodiment, the cross type focus detection areas ARH and ARV, and ALH and ALV are set in the locations other than the center of the photographing image plane P, and one of the strip type focus detection areas ARH and ALH in the cross type focus detection areas are set on the radial lines from the center of the photographing image plane P and at the same time, the length WRLH of the strip type focus detection areas ARH and ALH set on the radial lines is defined to be shorter than the length WRLV of the strip type focus detection areas ARV and ALV which intersect at right angles with the strip type focus detection areas ARH and ALH. Then, based on the output signals from the photoelectric converting device which receives the light beams having passed these cross type detection areas ARH and ARV, and ALH and ALV through a focus detection optical system, the focus adjustment condition of the photographing optical system is detected by a focus detection computing device for each of the focus detection area.

Now, the present invention will be described in conjunction with FIG. 20 which illustrates an embodiment thereof. Here, an embodiment according to the present invention is applicable to a focus detection apparatus which is provided with a focus detection optical system to guide onto a photoelectric converting device the light beams having passed the cross type focus detection areas having two strip type focus detection areas set to intersect at right angles in the photographing image plane, a photoelectric converting device having plural pairs of light receiving portions formed by a plurality of pixels for each of the focus detection areas to receive the light beams having passed each of the strip type focus detection areas, and a focus detection computing device to detect the focus adjustment conditions of the photographing optical system for each of the strip type focus detection areas on the basis of output signals from this photoelectric converting device.

Then, the cross type focus detection areas are set in the locations other than the center thereof, and one of the strip type focus detection areas in the cross type focus detection area are set on the radial lines from the center of the photographing plane and the pixel pitches and/or pixel widths of the pair of the light receiving portions PLH1 and PLH2 and the pixel pitches and/or pixel widths of the pair of light receiving portions PLV1 and PLV2 for the strip type focus detection areas which intersect at right angles with the strip type focus detection areas PLH1 and PLH2 are defined to be relatively different. Hence achieving the above-mentioned object.

In the present embodiment, the cross type focus detection areas are set in the locations other than the center of the photographing image plane, and one of the strip type focus detection areas in the cross type focus detection area are set on the radial lines from the center of the photographing plane and the pixel pitches and/or pixel widths of the pair of the light receiving portions PLH1 and PLH2 and the pixel pitches and/or pixel widths of the pair of light receiving portions PLV1 and PLV2 for the strip type focus detection areas which intersect at right angles with the strip type focus detection areas PLH1 and PLH2 are defined to be relatively different. Then, based on the output signals from the photoelectric converting device which receives the light beams having passed these cross type detection areas through a focus detection optical system, the focus adjustment condition of the photographing optical system is detected by a focus detection computing device for each of the focus detection areas.

In an embodiment according to the present invention, the pixel pitches KRLH1 and KRLH2 of the light receiving portions PLH1 and PLH2 for the strip type focus detection areas set on the radial lines from the center of the photographing image plane are defined to be finer than the pixel pitches KRLV of the light receiving portions PLV1 and PLV2 which intersect at right angles with the strip type focus detection areas.

In the present embodiment, the pixel pitches KRLH1 and KRLH2 of the light receiving portions PLH1 and PLH2 for the strip type focus detection areas set on the radial lines from the center of the photographing image plane are defined to be finer than the pixel pitches KRLV of the light receiving portions PLV1 and PLV2 which intersect at right angles with the strip type focus detection areas. Then, based on the output signals from the photoelectric converting device which receives the light beams having passed these strip type detection areas through a focus detection optical system, the focus adjustment condition of the photographing optical system is detected by a focus detection computing device for each of the focus detection area.

Further, an embodiment according to the present invention, the pixel widths HRLH1 and HRLH2 of the light receiving portions PLH1 and PLH2 for the strip type focus detection areas set on the radial lines from the center of the photographing image plane are defined to be wider than the pixel widths HRLV of the light receiving portions PLV1 and PLV2 for the strip type focus detection areas which intersect at right angles with these strip type focus detection areas.

In the present embodiment, the pixel widths HRLH1 and HRLH2 of the light receiving portions PLH1 and PLH2 for the strip type focus detection areas set on the radial lines from the center of the photographing image plane are defined to be wider than the pixel widths HRLV of the light receiving portions PLV1 and PLV2 for the strip type focus detection areas which intersect at right angles with these strip type focus detection areas. Then, based on the output signals from the photoelectric converting device which receives the light beams having passed these strip type detection areas through a focus detection optical system, the focus adjustment condition of the photographing optical system is detected by a focus detection computing device for each of the focus detection area.

Now, the present invention will be described in conjunction with FIG. 20 which illustrates an embodiment thereof. Here, an embodiment according to the present invention is applicable to a focus detection apparatus which is provided with a focus detection optical system to guide onto a photoelectric converting device the light beams having passed the focus detection areas in the photographing image plane, a photoelectric converting device having a pair of light receiving portions formed by a plurality of pixels for each of the focus detection areas to receive the light beams having passed the focus detection areas, and a focus detection computing device to detect the focus adjustment conditions of the photographing optical system for the focus detection areas on the basis of output signals from this photoelectric converting device.

Then, the focus detection areas are set on the radial lines from the center of the photographing image plane, and the pixel pitches KRLH1 and/or pixel width HRLH1 of one of the light receiving portions PLH1 in the pair of light receiving portions PLH1 and PLH2 for these focus detection areas and the pixel pitches KRLH2 and/or pixel widths HRLH2 of the other light receiving portions PLH2 are defined to be relatively different. Hence achieving the above mentioned object.

In the present embodiment, the focus detection areas are set on the radial lines from the center of the photographing image plane and at the same time, the pixel pitches KRLH1 and/or pixel width HRLH1 of one of the light receiving portions PLH1 in the pair of light receiving portions PLH1 and PLH2 for these focus detection areas and the pixel pitches KRLH2 and/or pixel widths HRLH2 of the other light receiving portions PLH2 are defined to be relatively different. Then, based on the output signals from the photoelectric converting device which receives the light beams having passed these detection areas through a focus detection optical system, the focus adjustment condition of the photographing optical system is detected by a focus detection computing device for the focus detection areas.

Now, the present invention will be described in conjunction with FIG. 21 which illustrates an embodiment thereof. Here, an embodiment according to the present invention is applicable to a focus detection apparatus which is provided with a focus detection optical system to cause an objective images in the focus detection areas set in the photographing image plane to be refocused on a photoelectric converting device to form the secondary objective images, a photoelectric converting device having a pair of light receiving portions formed by a plurality of pixels for each of the focus detection areas to receive the light beams having passed the focus detection areas, and a focus detection computing device to detect the focus adjustment conditions of the photographing optical system for the focus detection areas on the basis of output signals from this photoelectric converting device.

Then, the focus detection areas are set on the radial lines from the center of the photographing image plane, and the respective pixel pitches of the pair of light receiveing portions PLH1 and PLH2 are defined so as to correct the distortions of the refocused secondary objective images. Hence achieving the above mentioned object.

In the present embodiment, the focus detection areas are set on the radial lines from the center of the photographing image plane and at the same time, the respective pixel pitches of the pair of light receiving portions PLH1 and PLH2 are defined so as to correct the distortions of the refocused secondary objective images. Then, based on the output signals from the photoelectric converting device which receives the objective images in these detection areas through a focus detection optical system, the focus adjustment condition of the photographing optical system is detected by a focus detection computing device for the focus detection areas.

Now, the present invention will be described in conjunction with FIG. 22 which illustrates an embodiment thereof. Here, an embodiment according to the present invention is applicable to a focus detection apparatus which is provided with a focus detection optical system to guide onto a photoelectric converting device the light beams having passed a plurality of focus detection areas set to the photographing image plane, a photoelectric converting device having a pair of light receiving portions formed by a plurality of pixels for each of the focus detection areas to receive the light beams having passed each of the focus detection areas, and a focus detection computing device to detect the focus adjustment conditions of the photographing optical system for each of the focus detection areas on the basis of output signals from this photoelectric converting device.

Then, a plurality of focus detection areas are set in the center of the photographing image plane and in the location other than the center thereof, and the slanting angles LCH and LCV of the pixels of a pair of light receiving portions PCH1 and PCH2, and PCV1 and PCV2 for the focus detecting areas set in the center of the photographing image plane and the slanting angles LRLH and LRLV of the pixels of a pair of light receiving portions PLH1 and PLH2, and PLV1 and PLV2 for the focus detection areas set in the locations other than the center of the photographing image plane are defined to be relatively different. Hence achieving the above-mentioned object.

In the present embodiment, a plurality of focus detection areas are set in the center of the photographing image plane and in the location other than the center thereof, and the slanting angles LCH and LCV of the pixels of a pair of light receiving portions PCH1 and PCH2, and PCV1 and PCV2 for the focus detecting areas set in the center of the photographing image plane and the slanting angles LRLH and LRLV of the pixels of a pair of light receiving portions PLH1 and PLH2, and PLV1 and PLV2 for the focus detection areas set in the locations other than the center of the photographing image plane are defined to be relatively different. Then, based on the output signals from the photoelectric converting device which receives the light beams having passed these plural detection areas through a focus detection optical system, the focus adjustment condition of the photographing optical system is detected by a focus detection computing device for each of the focus detection areas.

In this respect, although the drawings for the corresponding embodiments are used for making the present invention readily understandable, it is not to be construed in a limiting sense. It is to be understood that the present invention is not confined thereto by the use of such drawings.

BRIEF DESCRIPTION OF THE DRAWINGS

FIG. 1A illustrates an example in which these areas are set on one straight line in the longer side direction in the image plane, and FIG. 1B, an example in which these areas are set on one straight line in the diagonal direction in the image plane.

FIGS. 7A, 7B, and 7C are views showing the image heights and distortions when the primary image of the object formed in the focus detection area in the center of the image plane shown in FIG. 5 is refocused by the focus detection optical system shown in FIG. 6 on a photoelectric conversion sensor as a pair of secondary objective images. FIG. 7A shows the image height and distortion of the refocused secondary objective image by one of the paired separator lenses; FIG. 7B, the image height and distortion of the refocused secondary objective image by the other one of the paired separator lenses; and FIG. 7C, the difference between a pair of distortions shown in FIGS. 7A and 7B.

FIGS. 8A, 8B, and 8C are views showing the image heights and distortions when the primary image of the object formed in the focus detection area in the location other than the center of the image plane shown in FIG. 5 is refocused by the focus detection optical system shown in FIG. 6 on a photoelectric conversion sensor as a pair of secondary objective images. FIG. 8A shows the image height and distortion of the refocused secondary objective image by one of the paired separator lenses; FIG. 8B, the image height and distortion of the refocused secondary objective image by the other one of the paired separator lenses; and FIG. 8C, the difference between a pair of distortions shown in FIGS. 8A and 8B.

DETAILED DESCRIPTION OF THE PREFERRED EMBODIMENTS

Figure 12:
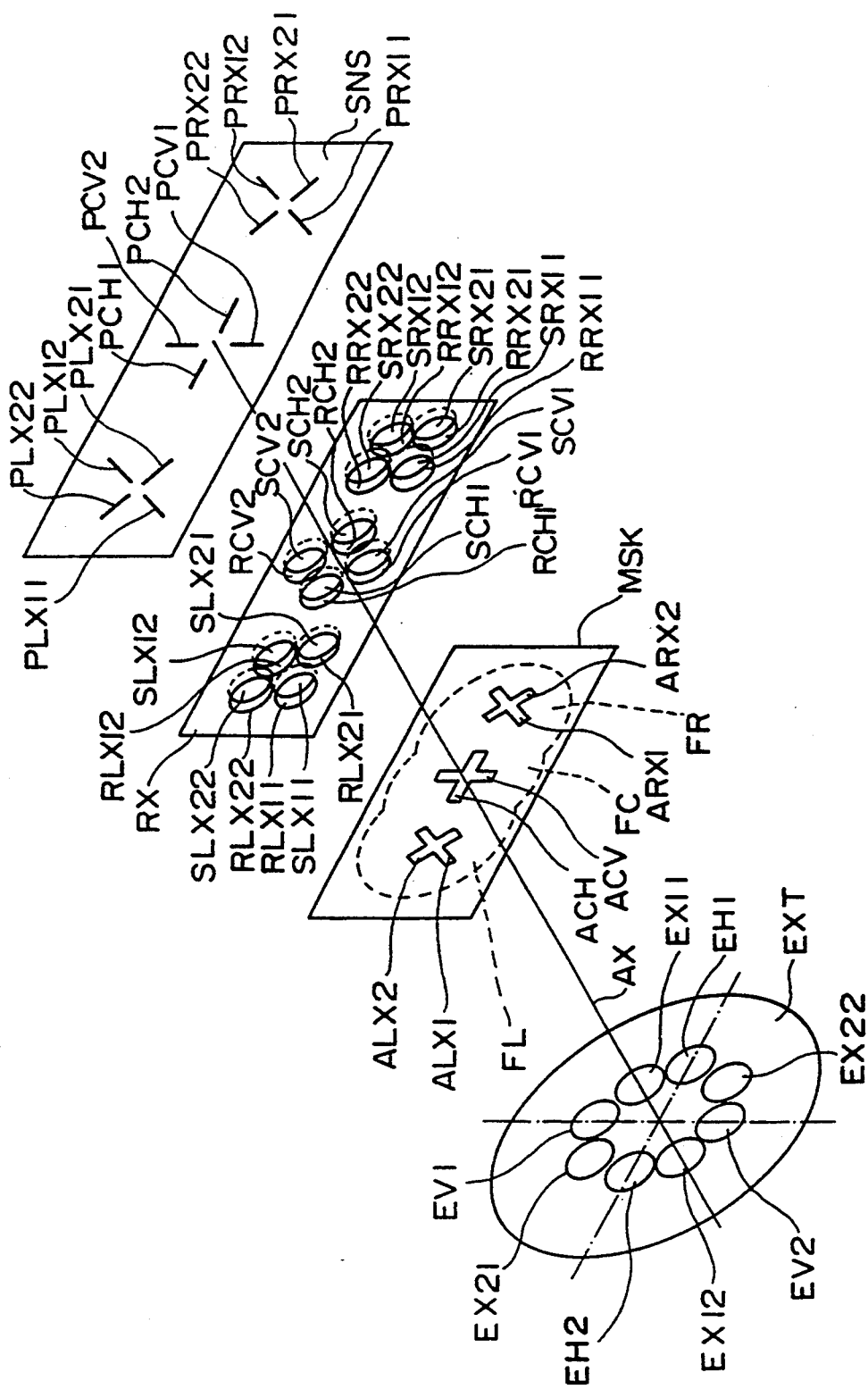
FIG. 12 is a view illustrating the structure of an embodiment of a focus detection optical system according to the present invention.

FIG. 12 is a view showing the structure of the optical system of a focus detection apparatus according to the present invention.

Figure 13A:
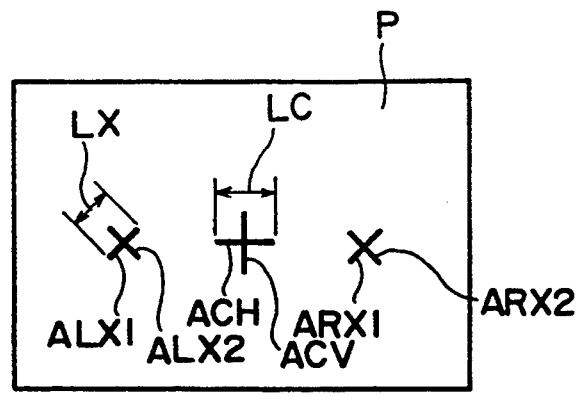
FIG. 13A is a view showing the arrangement of the focus detection areas of the focus detection optical system shown in FIG. 12.

In FIG. 12, a reference mark AX designates the optical axis of a photographing optical system which is not shown; MSK, the field mask provided in the vicinity of the expected image formation plane equivalent to the film plane of the photographing optical system; ARX1, ARX2, ACH, ACV, ALX1, and ALX2, the openings of the field mask MSK for each of the focus detection areas shown in FIG. 13A. In this respect, the description will be made hereunder by giving the corresponding marks of the openings of the field mask MSK to the marks of the focus detection areas. The focus detection areas ARX1, ARX2, ACH, ACV, ALX1, and ALX2 are set in such a manner than the two focus detection areas are rectangular to each other to form a cross type focus detection area. The focus detection area ACH is set in the center of the image plane along the longer side direction of the photographing image plane P while the focus detection area ACV set in the center of the image plane along the shorter side direction in the photographing image plane P. The focus detection areas ARX1, ARX2, ALX1, and ALX2 are set in the locations other than the center of the image plane at an angle of 45 degrees respectively to the focus detection areas ACH and ACV. These three cross type focus detection areas are arranged on one straight line in the longer side direction in the image plane. In this respect, for the maintenance of the focus detection precision as described above, the length LX of the focus detection areas ARX1, ARX2, ALX1, and ALX2 set in the locations other than the center of the image plane is defined to be shorter than the length LC of the focus detection areas ACH and ACV set in the center of the image plane as shown in FIG. 13A.

Reference marks FR, FC, and FL designate condenser lenses each for the cross type focus detection areas ARX1 and ARX2, ACH and ACV, and ALX1 and ALX2. The optical axes of the condensor lenses FR and FL are decentered from the centers of the ARX1 and ARX2 and ALX1 and ALX2 to the optical axis AX side to deflect the light beams passing through the cross type focus detection areas ARX1 and ARX2, and ALX1 and ALX2 to the optical axis AX side. In this respect, the condenser lenses FR, FC, and FL are of a shape as if produced by cutting round lenses which are bonded at its boundary faces, and are made of a plastic material integrally molded.

A reference mark RX designates a diaphragm mask, and RRX11, RRX12, RRX21, RRX22, RCH1, RCH2, RCV1, RCV2, RLX11, RLX12, RLX21, and RLX22, diaphragm openings of the diaphragm mask RX. The diaphragm mask openings RRX11 and RRX12, RRX21 and RRX22, RCH1 and RCH2, RCV1 and RCV2, RLX11 and RLX21, and RLX21 and RLX22 make respective pairs for the focus detection areas ARX1, ARX2, ACH, ACV, ALX1, and ALX2. The line connecting the centers of the diaphragm mask openings RRX11 and RRX12 and the line connecting the diaphragm mask openings RRX21 and RRX22 are rectangular. Likewise, the line connecting the centers of the diaphragm mask openings RCH1 and RCH2 and the line connecting the diaphragm mask openings RCV1 and RCV2 are rectangular, and the line connecting the centers of the diaphragm mask openings RLX11 and RLX12 and the line connecting the diaphragm mask openings RLX21 and RLX22 are rectangular.

Reference marks SRX11, SRX12, SRX21, SRX22, SCH1, SCH2, SCV1, SCV2, SLX11, SLX12, SLX21, and SLX22 designate the separator lenses which are respectively arranged behind the diaphragm mask openings RRX11, RRX12, RRX21, RRX22, RCH1, RCH2, RCV1, RCV2, RLX11, RLX12, RLX21, and RLX22, and the SRX11 and SRX12, SRX21 and SRX22, SCH1 and SCH2, SCV1 and SCV2, SLX11 and SLX12, and SLX21 and SLX22 make respective pairs. The line connecting the centers of the separator lenses SRX11 and SRX12 and the line connecting the centers of the separator lenses SRX21 and SRX22 are rectangular. Likewise, the line connecting the centers of the separator lenses SCH1 and SCH2 and the line connecting the centers of the separator lenses SCV1 and SCV2 are rectangular, and the line connecting the centers of the separator lenses SLX11 and SLX12 and the line connecting the centers of the separator lenses SLX21 and SLX22 are rectangular. The separator lenses SRX11, SRX12, SRX21, and SRX22, the separator lenses SCH1, SCH2, SCV1, and SCV2, and the separator lenses SLX11, SLX12, SLX21, and SLX22 form respective separator lens groups. Then, these three separator lens groups are formed integrally on a transparent plastic board.

Reference mark SNS designates a sensor for performing photoelectric conversion and PRX11, PRX12, PRX21, PRX22, PCH1, PCH2, PCV1, PCV2, PLX11, PLX12, PLX21, and PLX22 are the light receiving portions of the sensor SNS. These light receiving portions PRX11 and PRX12, PRX21 and PRX22, PCH1 and PCH2, PCV1 and PCV2, PLX11 and PLX12, and PLX21 and PLX22 make respective pairs each for the focus detection areas ARX1, ARX2, ACH, ACV, ALX1, and ALX2, so that the objective images in the respective focus detection areas by the photographing optical system are refocused on these light receiving portions to form a pair of secondary objective images. In this respect, the respective light receiving portions constitute the primary pixel arrays of a charge storage type, which are formed by a plurality of pixels.

Subsequently, the operation of this focus detection apparatus will be described.

The diaphragm mask openings RRX11, RRX12, RRX21, and RRX22 are projected by the condenser lens FR onto the pupil areas EX11, EX12, EX21, and EX22 of the exit pupil plane EXT of the photographing optical system. Also, the diaphragm mask openings RCH1, RCH2, RCV1, and RCV2 are projected by the condenser lens FC onto the pupil areas EH1, EH2, EV1, and EV2 of the exit pupil plane EXT of the photographing optical system. Further, The diaphragm mask openings RLX11, RLX12, RLX21, and RLX22 are projected by the condenser lens FL onto the pupil areas EX11, EX12, EX21, and EX22 of the exit pupil plane EXT of the photographing optical system.

Therefore, the primary image of an object which has passed pupil areas EH1 and EH2 is formed by the photographing optical system in the vicinity of the expected image formation plane and allowed to pass the focus detection area ACH of the field mask MSK and the diaphragm mask RX openings RCH1 and RCH2 and then refocused by the separator lenses SCH1 and SCH2 on the light receiving portions PCH1 and PCH2 of the sensor SNS as the secondary objective images. Likewise, the primary image of an object which has passed pupil areas EV1 and EV2 is formed by the photographing optical system in the vicinity of the expected image formation plane and allowed to pass the focus detection area ACV of the field mask MSK and the diaphragm mask RX openings RCV1 and RCV2 and then refocused by the separator lenses SCV1 and SCV2 on the light receiving portions PCV1 and PCV2 of the sensor SNS as the secondary objective images. The primary image of an object which has passed pupil areas EX11 and EX12 is formed by the photographing optical system in the vicinity of the expected image formation plane and allowed to pass the focus detection area ALX1 and ARX1 of the field mask MSK and the diaphragm mask RX openings RLX11, RLX12, RRX11, and RRX12, and then refocused by the separator lenses SLX11, SLX12, SRX11, and SRX12 on the light receiving portions PLX11, PLX12, PRX11, and PRX12 of the sensor SNS as the secondary objective images. The primary image of an object which has passed pupil areas EX21 and EX22 is formed by the photographing optical system in the vicinity of the expected image formation plane and allowed to pass the focus detection area ALX2 and ARX2 of the field mask MSK and the diaphragm mask RX openings RLX21, RLX22, RRX21, and RRX22, and then refocued by the separator lenses SLX21, SLX22, SRX21, and SRX22 on the light receiving portions PLX21, PLX22, PRX21, and PRX22 of the sensor SNS as the secondary objective images.

In accordance with the output signals from these light receiving portions PRX11 and PRX12, PRX21 and PRX22, PCH1 and PCH2, PCV1 and PCV2, PLX11 and PLX12, and PLX21 and PLX22, the known relative computation processes are given respectively to detect the focus adjustment condition of the photographing optical system for each of the focus detection areas ARX1, ARX2, ACH, ACV, ALX1, and ALX2.

By a structure such as this, the three cross type focus detection areas ARX1 and ARX2, ACH and ACV, and ALX1 and ALX2 are set in the center of the photographing image plane P and on the left-hand and right-hand sides thereof, and further the left-hand and right-hand side cross type focus detection areas are set at an angle of 45 degrees respectively to the cross type focus detection areas ACH and ACV in the center.

Figure 13B:
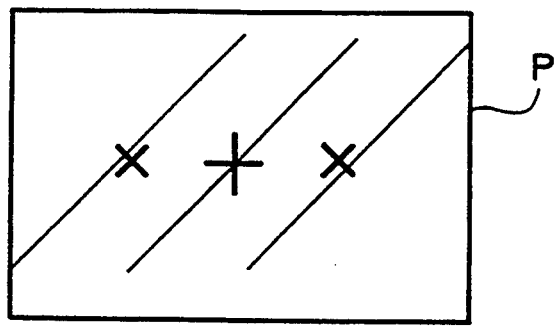
FIG. 13B is a view showing the relationship between the focus detection areas and the edge of an object having slanting patterns.

In a focus detection apparatus in which the focus detection areas are set as described above, it is possible as shown in FIG. 13B to perform a highly precise focus detection with the left-hand and right-hand side focus detection areas even for an object having slanting patterns which tends to cause the conventional focus detection areas to be disabled in performing its detection or to lower the precision of its detection, and also, to perform a highly precise focus detection for an object having vertical and horizontal patterns with the focus detection areas in the center of the image plane.

Hereinafter, the description will be made of the other focus detection areas set by modifying the focus detection optical system shown in FIG. 12. In this respect, the explanation of the focus detection optical system is omitted in the following description.

Figure 14:
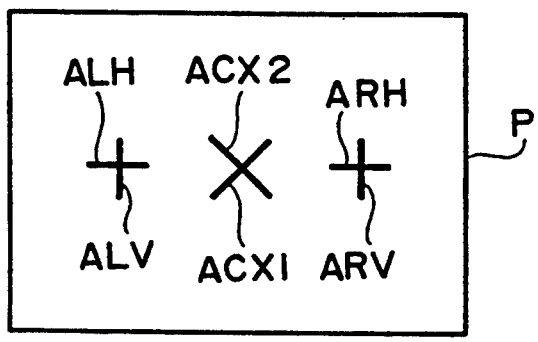
FIG. 14 is a view illustrating an other setting example of the cross type focus detection areas.

FIG. 14 illustrates another setting example of the focus detection areas.

The focus detection areas ARH and ARV, ACX1 and ACX2, and ALH and ALV are set to intersect at right angles with each other to form the cross type focus detection areas, respectively. The focus detection areas ARH and ALH are set on the longer side direction of the image plane in the locations on the left-hand and right-hand sides apart from the center of the image plane. Also, the focus detection areas ARV and ALV are set in the shorter side direction of the image plane in the locations on the left-hand and right-hand sides apart from the center of the image plane. Further, the focus detection areas ACX1 and ACX2 are set in the center of the image plane at an angle of 45 degrees to the focus detection areas ARH, ALH, ARV, and ALV. The three cross type focus detection areas are arranged on one straight line in the longer side direction in the image plane. In this respect, for the performance of the high precision focus detections as described above, the length of the focus detection areas ARH, ARV, ALH, and ALV set in the locations other than the center of the image plane is defined to be shorter than the length of the focus detection areas ACX1 and ACX2 set in the center of the image plane.

By setting the focus detection areas in this way, it is possible to obtain the same effects obtainable by the focus detection apparatus shown in FIG. 13A.

Figure 15:
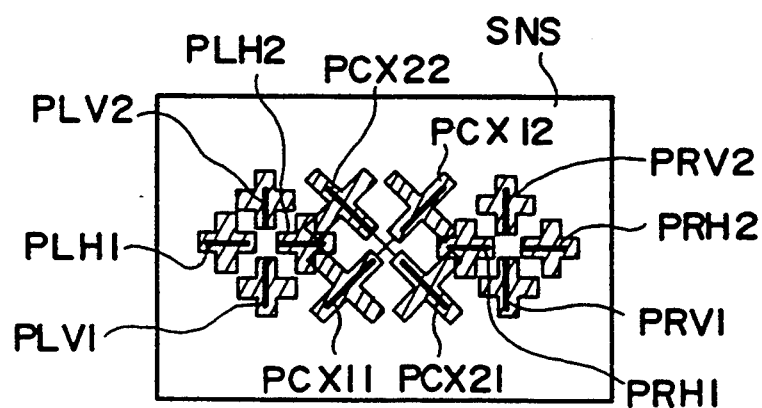
FIG. 15 is a view showing the relationship between the arrangement of the light receiving portions on a sensor for each of the focus detection areas shown in FIG. 14 and the secondary objective images.

FIG. 15 shows the relationship between the arrangement of the light receiving portions PRH1, PRH2, PRV1, PRV2, PCX11, PCX12, PCX21, PCX22, PLH1, PLH2, PLV1, and PLV2 of the sensor SNS for each of the focus areas shown in FIG. 14 and the secondary objective images.

The light receiving portions PRH1 and PRH2, PRV1 and PRV2, PCX11 and PCX12, PCX21 and PCX22, PLH1 and PLH2, and PLV1 and PLV2 make respective pairs for each of the focus detection areas ARH, ARV, ACX1, ACX2, ALH, and ALV. The objective images formed in the respective focus detection areas are refocused on the respective pair of light receiving portions PRH1 and PRH2, PRV1 and PRV2, PCX11 and PCX12, PCX21 and PCX22, PLH1 and PLH2, and PLV1 and PLV2 as a pair of the secondary objective images, respectively. The secondary objective images are formed within a range where there is a reflection of the respective focus detection areas having the shapes indicated by slanting lines in FIG. 15.

For example, if the directions of adjacent focus detection areas are different as in the cases of the light receiving portions PCX22 and PCX11 against the light receiving portion PLH2 and the light receiving portions PCX12 and PCX21 against the light receiving portion PRH1, the alignment directions of the light receiving portions on the sensor SNS are made different so as to make the arrangements of the light receiving portions compact as shown in FIG. 15. Accordingly, the chip size of the sensor SVS can be made smaller to implement the reduction of the manufacturing cost.

Figure 16:
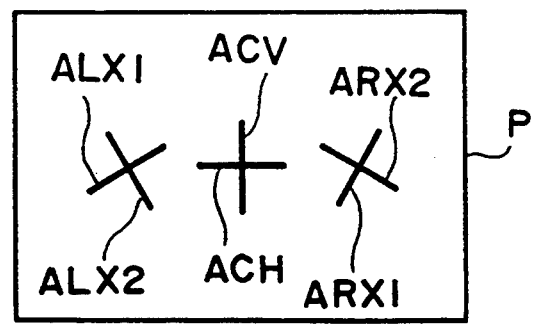
FIG. 16 is a view illustrating another setting example of the cross type focus detection areas.

FIG. 16 illustrates another setting example of the focus detection areas.

The focus detection areas ARX1 and ARX2, ACH and ACV, and ALX1 and ALX2 are set to intersect at right angles with each other to form the cross type focus detection areas, respectively. The focus detection area ACH is set in the longer side direction of the image plane in the center of the photographing image plane P. Also, the focus detection areas ACV is set in the shorter side direction of the image plane in the center of the image plane. The focus detection areas ARX1, ARX2, ALX1 and ALX2 are set in the location apart from the center of the image plane in the directions opposite to the respective focus detection areas ACH and ACV, and further the focus detection areas ARX1 and ARX2 are set at an angle of 45 degrees to the focus detection areas ALX1 and ALX2 respectively. Also, the three cross type focus detection areas are arranged on one straight line in the longer side direction in the image plane. In this respect, for the performance of the high precision focus detections as described above, the length of the focus detection areas ARX1, ARX2, ALX1, and ALX2 in the locations other than the center of the image plane is defined to be shorter than the length of the focus detection areas ACH and ACV set in the center of the image plane.

Now, the directions of the respective focus detection areas included in the three cross type focus detection areas are all different. Therefore, it is possible to perform highly precise focus detections for object patterns of any angles.

Figure 17:
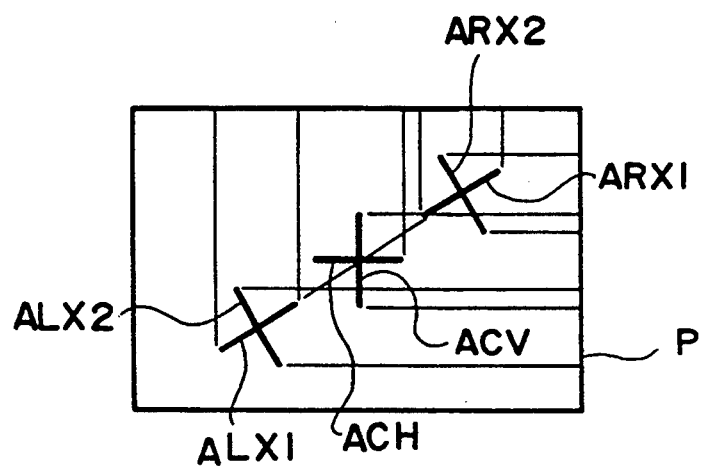
FIG. 17 is a view illustrating another setting example of the cross type focus detection areas.

FIG. 17 illustrates another setting example of the focus detection areas.

The focus detection areas ARX1 and ARX2, ACH and ACV, and ALX1 and ALX2 intersect at right angles with each other to form the cross type focus detection areas. The focus detection area ACH is set in the longer side direction in the center of the photographing image plane P. The focus detection area ACV is set in the shorter side direction in the center of the image plane. The focus detection areas ARX1 and ARX2 are set at the upper right-hand side of the photographing image plane P in the different directions and angles to the focus detection areas ACH and ACV while the focus detection areas ALX1 and ALX2 are set at the lower left-hand side in the different directions and angles to the focus detection areas ACH and ACV, respectively. Also the focus detection areas ARX1 and ARX2 are set in the same directions and angles to the focus detection areas ALX1 and ALX2. The focus detection areas ARX1 and ALX1 are set on the radial lines from the center of the photographing image plane P, and the focus detection areas ARX2 and ALX2 which intersect at right angles with these focus detection areas ARX1 and ALX1 respectively are naturally set in the contacting direction of the center of the photographing image plane P and concentric circles. Also, these three cross type focus detection areas are arranged on one straight line in the diagonal direction of the photographing image plane P. In this respect, for the performance of the high precision detections as described above, the length of the focus detection areas ARX1, ARX2, ALX1, and ALX2 set in the locations other than the center of the photographing image plane P is defined to be shorter than the length of the focus detection areas ACH and ACV set in the center of the image plane.

In this way, the focus detection areas are set in such a manner that the projections of the three cross type focus detection areas in the longer side direction and shorter side direction have lesser portions where they are overlapped with each other. Hence improving its complementary capability for the vertical and horizontal objective pattens.

Figure 18:
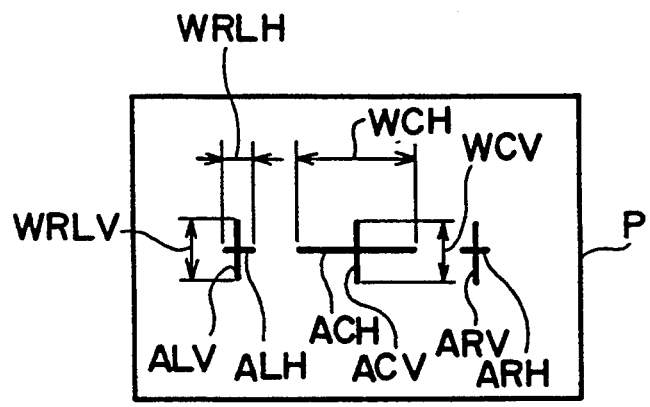
FIG. 18 is a view illustrating another setting example of the cross type focus detection areas.

FIG. 18 illustrates another setting example of the focus detection areas.

The focus detection areas ARH and ARV, ACH and ACV, and ALH and ALV intersect at right angles with each other to form cross type focus detection areas. The focus detection area ACH is set in the longer side direction in the center of the photographing image plane P, and the focus detection areas ARH and ALH are set on the left-hand and right-hand sides in the image plane in the longer side direction. The focus detection area ACV is set in the shorter side direction in the center of the image plane, and the focus detection areas ARV and ALV are on the left-hand and right-hand sides in the image plane in the shorter side direction. For the performance of high precision focus detections, the length WRLH of the focus detection areas ARH and ALH set on the left-hand and right-hand sides in the image plane and the length WRLV of the focus detection areas ARV and ALV are defined to be shorter then the lengths WCH and WCV of the focus detection areas ACH and ACV set in the center of the image plane, respectively. Further, the length WCV of the focus detection area ACV set in the shorter side direction in the center of the image plane is shorter than the length WCH of the focus detection area ACH set in the longer side direction in the center of the image plane, and the ratio of these lengths is set to be almost equal to the ratio between the wertical and horizontal image planes.

Thus, by making the ratio between the lengths of the focus detection areas set respectively in the longer side direction and the shorter side direction in the center of the photographing image plane P equal to the ratio between the vertical and horizontal photographing image planes P, it becomes possible to enhance the probability to complement an object with the focus detection areas when the focus is detected, and with the desirable balance provided for the photographing image plane P of the focus detection areas, this system can be conveniently used for the selection of a principal object out of a plurality of objects.

Further, the length WRLH of the focus detection areas ALH and ARH set in the longer side direction is defined to be shorter than the length WRLV of the focus detection areas ALV and ARV set in the shorter side direction on the left-hand and right-hand sides of the photographing image plane P. When the focus detection areas are to be set in the locations other than the center of the photographing image plane P as in this case, it is possible to prevent the degradation of the focus detection precision as described above by making the length of the focus detection areas set on the radial lines from the center of the image plane shorter than the length of the focus detection areas set in the contacting line of the center of the image plane and concentric circles.

Figure 19:
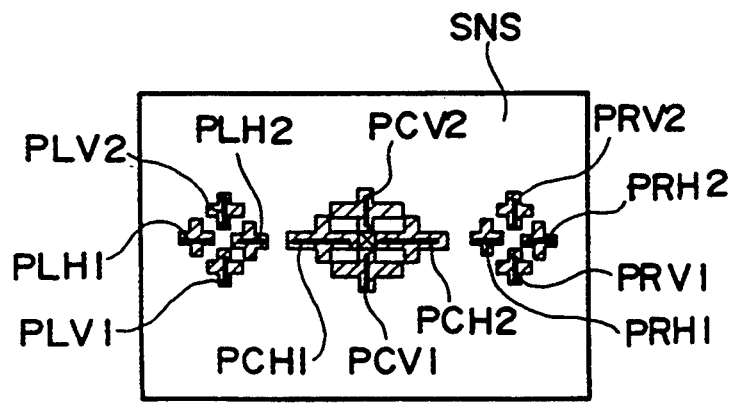
FIG. 19 is a view showing the relationship between the arrangement of the light receiving portions on a sensor for each of the focus detection areas shown in FIG. 18 and the secondary objective images.

FIG. 19 shows the relationship between the arrangement of the light receiving portions PRH1, PRH2, PRV1, PRV2, PCH1, PCH2, PCV1, PCV2, PLH1, PLH2, PLV1, and PLV2 on the sensor SNS for the focus detection areas shown in FIG. 18 and the secondary objective images.

The light receiving portions PRH1 and PRH2, PRV1 and PRV2, PCH1 and PCH2, PCV1 and PCV2, PLH1 and PLH2, and PLV1 and PLV2 make respective pairs for each of the focus detection areas ARH, ARV, ACH, ACV, ALH, and ALV. The objective images formed in the respective focus detection areas are refocused respectively on the paris of light receiving portions PRH1 and PRH2, PRV1 and PRV2, PCH1 and PCH2, PCV1 and PCV2, PLH1 and PLH2, and PLV1 and PLV2 as the secondary objective images. The secondary objective images are formed within a region where each of the focus detection areas indicated by slanting lines in FIG. 19 is reflected. Here, it is necessary for the light receiving portions PLH2 and PCH1, and PCH2 and PRH1, which are adjacent to the focus detection areas in the center of the image plane and the focus detection areas in the left hand and right-hand sides therein, to be provided with certain gaps between them so as not to receive the light of the secondary objective images in the other focus detection areas from each other.

Figure 20:
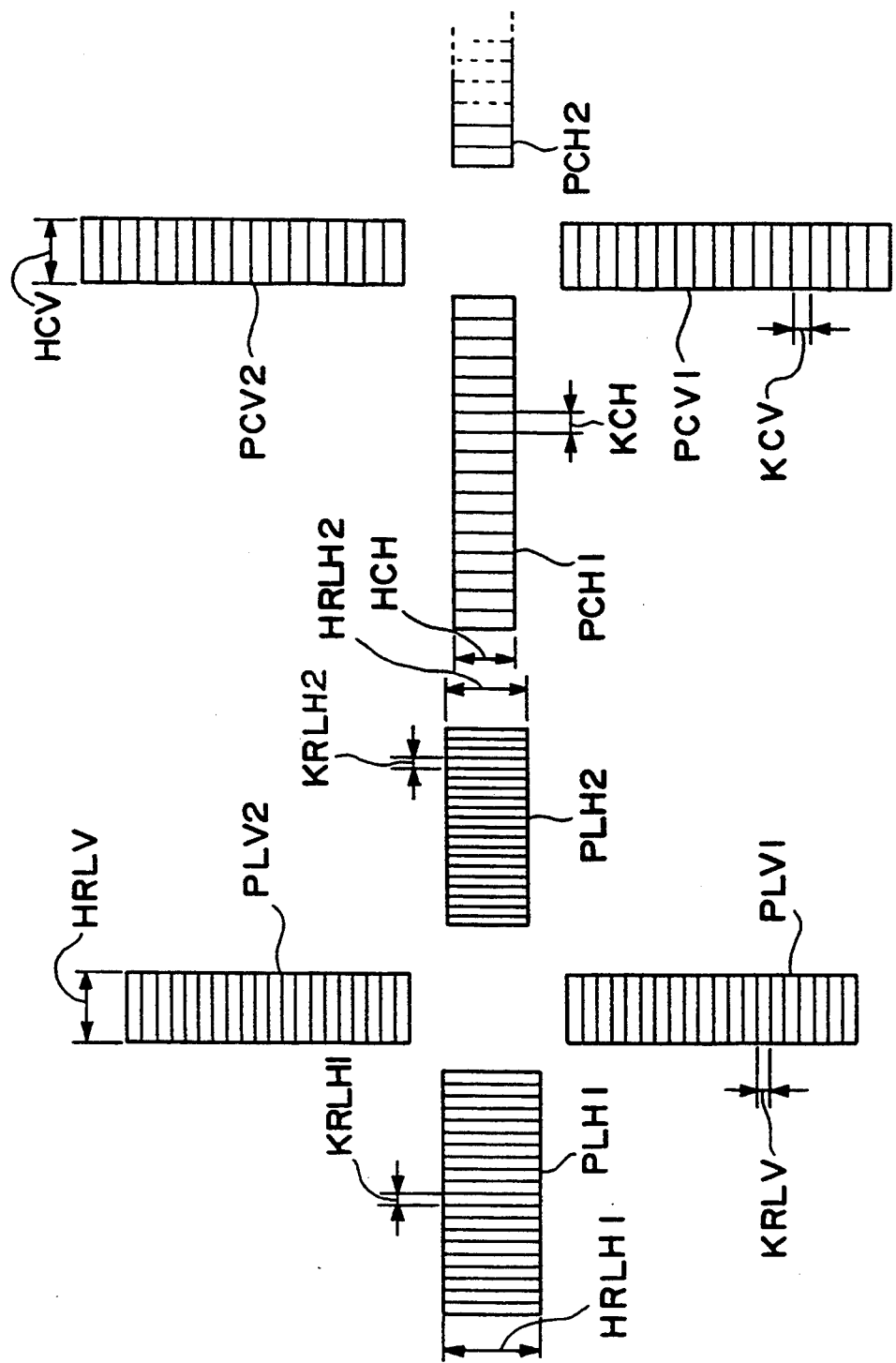
FIG. 20 is the detailed view of the light receiving portions on the sensor shown in FIG. 19.

FIG. 20 shows the details of the light receiving portions PRH1, PRH2, PRV1, PRV2, PCH1, PCH2, PCV1, PCV2, PLH1, PLH2, PLV1, and PLV2 of the sensor SNS shown in FIG. 19. In this respect, the light receiving portions PRH1, PRH2, PRV1, PRV2, and PCH2 and the light receiving portions PLH1, PLH2, PLV1, PLV2, and PCH1 are symmetrical to the center line of the sensor SNS in the longer side direction, and any representations by drawings and the descriptions thereof are omitted.

The pair of the light receiving portions PCV1 and PCV2 for the focus detection area set ACV in the shorter side direction in the center of the photographing image plane P have a pixel width HCV and pixel pitch KCV. The pair of the light receiving portions PCH1 and PCH2 for the focus detection area ACH set in the longer side direction in the center of the image plane have a pixel width HCH and pixel pitch KCH. The pair of the light receiving portions PLV1 and PLV2 for the focus detection area ALV set in the shorter side direction in the left-hand side of the image plane has the pixel width HRLV and pixel pitch KRLV. The light receiving portion PLH1 of the pair of the light receiving portions PLH1 and PLH2 for the focus detection area ALH set in the longer side direction in the left-hand side of the image plane, which is positioned away from the center of the sensor SNS, has the pixel width HRLH1 and pixel pitch KRLH1. The light receiving portion PLH2 of the light receiving portions PLH1 and PLH2 for the focus detection area ALH set in the longer side direction in the left-hand side of the image plane, which is positioned near to the sensor SNS, has the pixel width HRLH2 and pixel pitch KRLH2.

Figure 11:
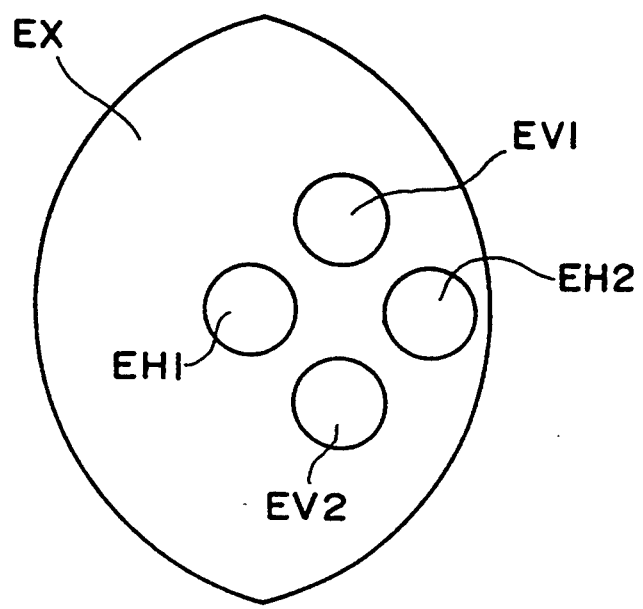
FIG. 11 is a view illustrating a substantial shape of a pupil aperture which is viewed to the lens side from the focus detection areas set in the locations other than the center of the image plane.
Figure 10:
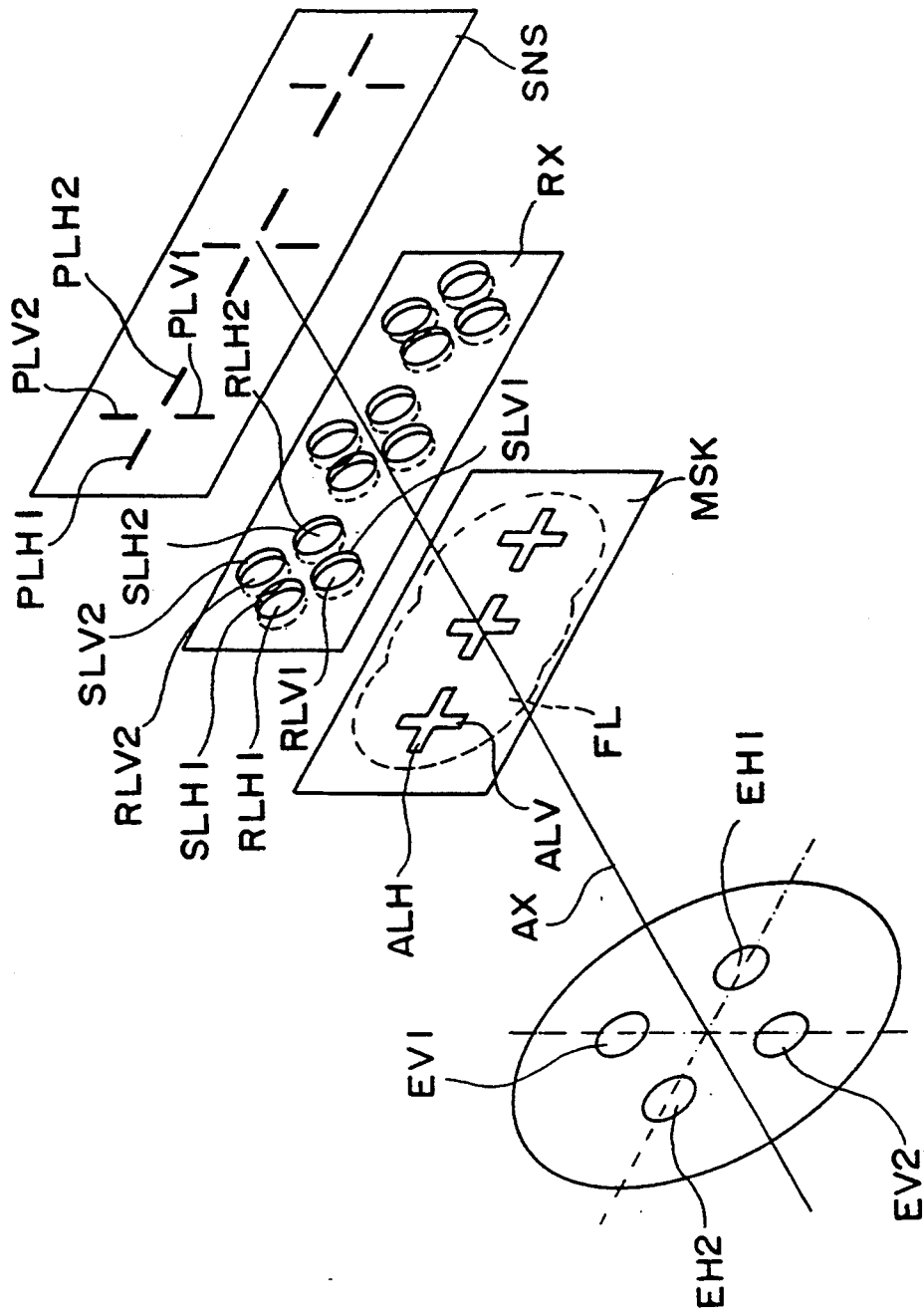
FIG. 10 is a view illustrating the structure of a focus detection apparatus in which the three cross type focus detection areas are set on one straight line in the longer side direction of the image plane in the center of the image plane and is the locations other than the center thereof.

Usually, in the circumference of the image plane, the quantity of light is reduced in the periphery due to the characteristics of the photographing optical system. Also, when a focus detection is performed in the circumference of the image plane, the illuminance on the light receiving portions is further reduced because the F value of the light beam for the focus detection in the circumference of the image plane is made greater than the F value of the light beam for the focus detection in the center of the image plane in order to prevent the occurrence of any eclipse by a lens having a large F number. Here, the F value of the light beam for the focus detection is an F value of the circumscribing circles of the pupil areas EH1, EH2, EV1, and EV2 shown in FIG. 11.

Therefore, the pixel widths HRLH1, HRLH2, and HRLV of the light receiving portions PLH1, PLH2, PLV1, and PLV2 for the focus detection areas ALH and ALV on the left-hand side in the image plane are made greater than the pixel widths HCH and HCV of the light receiving portions PCH1, PCH2, PCV1, and PCV2 for the focus detection areas ACH and ACV in the center of the image plane, thereby to compensate the lowering quantity of light in the light receiving portions in the circumference of the image plane.

Figure 1A:
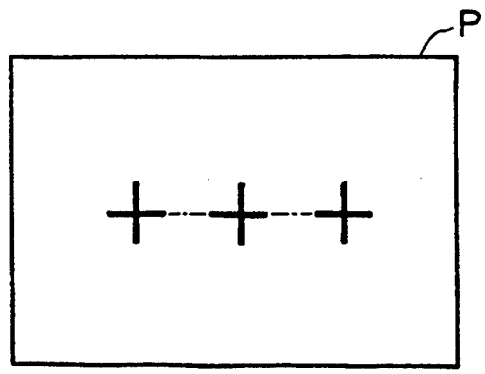
FIGS. 1A and 1B are views illustrating conventional setting examples of three cross type focus detection areas.
Figure 1B:
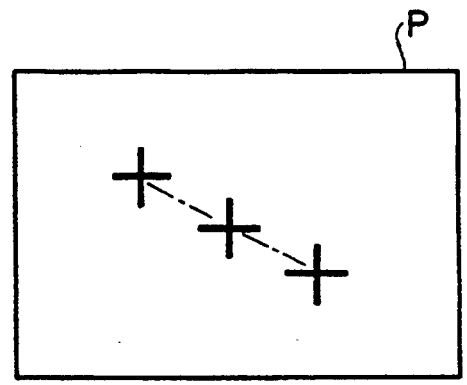
Figure 2A:
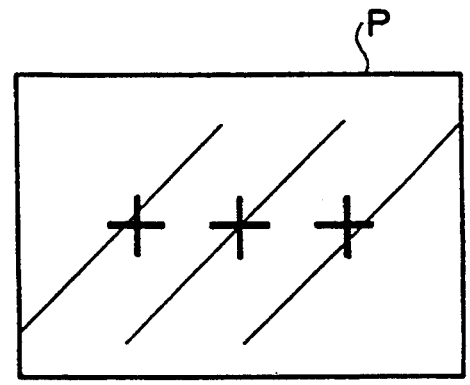
FIG. 2A is a view illustrating an example in which an object of a slanting pattern is complemented by the three cross type focus detection areas set on one straight line in the longer side direction in the image plane shown in FIG. 1A, and FIG. 2B, an example in which an object of a slanting pattern is complemented by the three cross type focus detection areas set on one straight line in the diagonal line in the image plane shown in FIG. 1B.
Figure 2B:
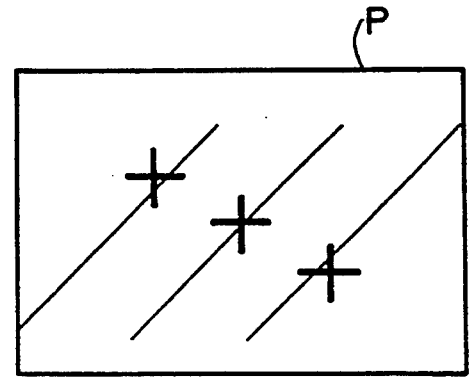
Figure 3A:
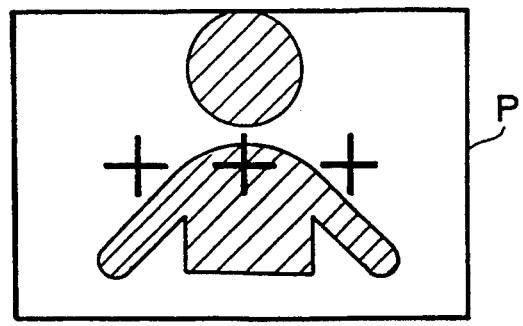
FIG. 3A is a view illustrating an example in which a portrait photograph is taken in the three cross type focus detection areas set on one straight line in the longer side direction in the image plane shown in FIG. 1A, and FIG. 3B, an example in which a portrait photograph is taken in the three cross type focus detection areas set on one straight line in the diagonal line in the image plane shown in FIG. 1B.
Figure 3B:
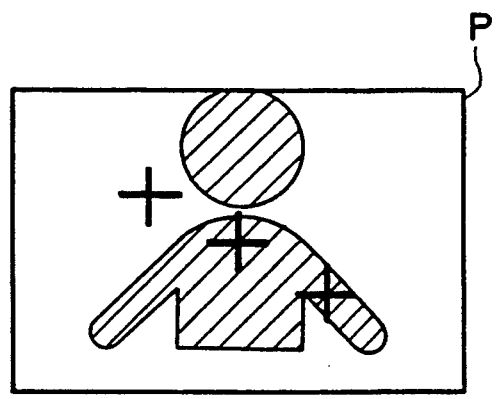
Figure 4A:
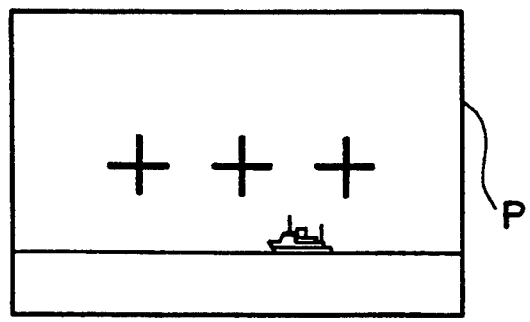
FIG. 4A is a view illustrating an example in which an object of vertical and horizontal patterns is complemented by the three cross type focus detection areas set on one straight line in the longer side direction in the image plane shown in FIG. 1A, and FIG. 4B, an example in which an object of vertical and horizontal patterns is complemented by the three cross type focus detection areas set on one straight line in the diagonal line in the image plane shown in FIG. 1B.
Figure 4B:
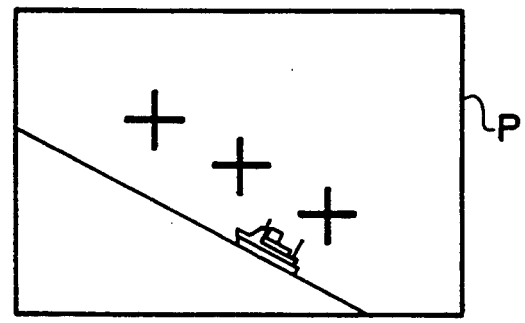
Figure 5:
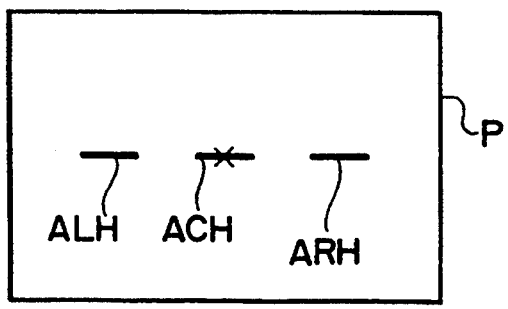
FIG. 5 is a view illustrating a conventional example of three strip type focus detection areas set on one straight line in the longer side direction in the image plane.
Figure 6:
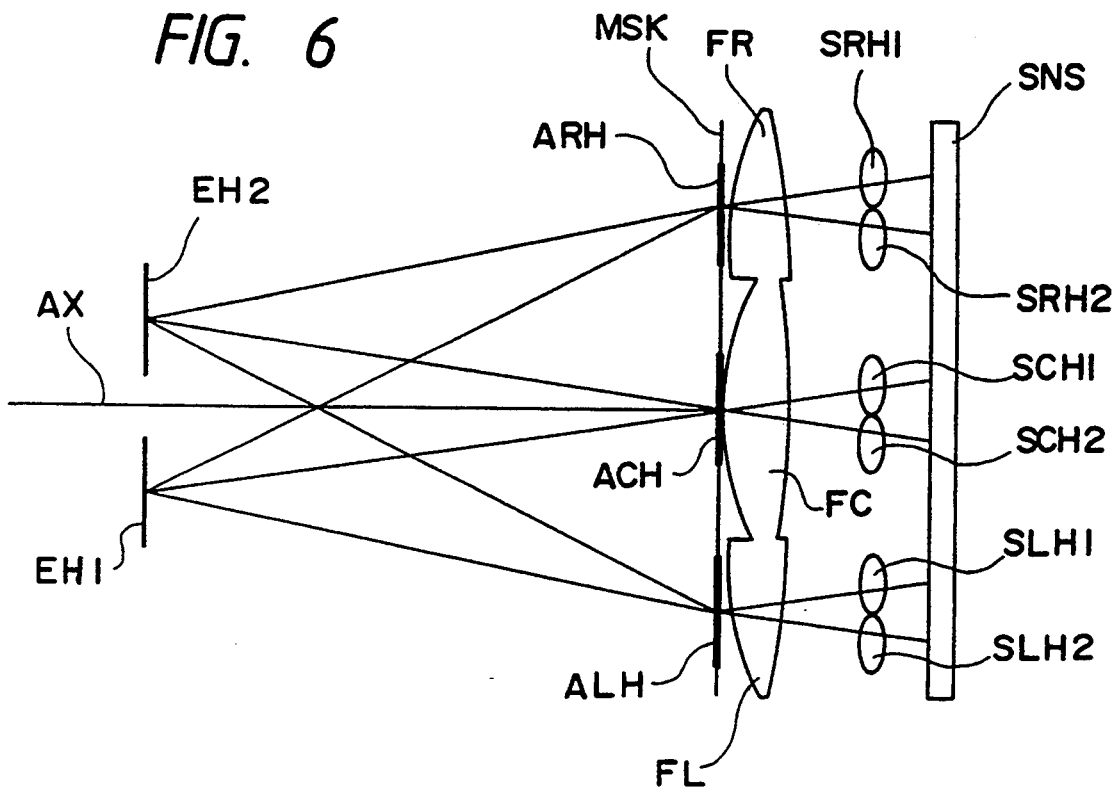
FIG. 6 is a view showing a focus detection optical system in which the focus detection areas shown in FIG. 5 are set.
Figure 9:
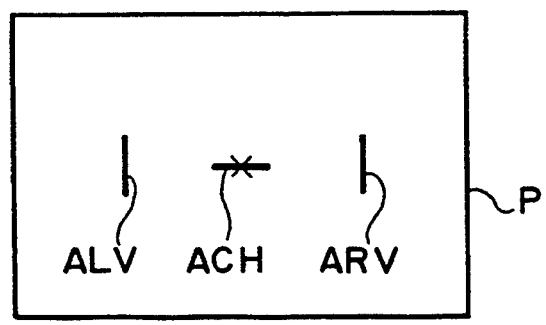
FIG. 9 is a view illustrating an example in which focus detection areas are set in the longer side direction in the center of the image plane of a photographing image plane and focus detection areas are set on the left-hand and right-hand sides of the focus detection areas in the direction of the contacting line between the center of the image plane and concentric circles.

Usually, as described above, when a focus detection is performed in the circumference of an image plane, the F value for the light beam for the focus detection in the periphery of the image plane is made greater than the F value of the light beams for the focus detection in the center of the image plane so as not to allow a lens having a larger F number to create any eclipse. On the other hand, when a focus detection is performed in the radial direction from the center of the image plane P as shown in FIG. 6, the eclipse condition becomes severer than when a focus detection is performed in the direction of the contacting line of the center of the image plane and concentric circles, and it is necessary to make the F value of the light beam for the focus detection in the radial direction (here, in the longer side direction in the image plane) still greater than the F value of the light beam for the focus detection in the direction of the circle contacting line (here, in the shorter side direction in the image plane). Accordingly, the illuminance on the light receiving portions PLH1 and PLH2 is lowered.

Therefore, the pixel widths HRLH1 and HRLH2 of the light receiving portions PLH1 and PLH2 for the focus detection area ALH in the longer side direction on the left-hand side in the image plane are defined to be greater than the pixel width HRLV of the light receiving portions PLV1 and PLV2 for the focus detection area ALV in the shorter side direction in the left-side in the image plane, thereby to compensate the imbalance of the illuminance in the setting directions of the focus detection areas in the circumference of the image plane.

Usually, when a focus detection is performed in the radial directions from the center of the image plane in the circumference of the image plane, a pair of focus detection image refocusing optical systems are arranged asymmetrically with respect to the optical axis AX of the photographing optical system as shown in FIG. 6. Consequently, due to the deflection of the optical axes AX of the condenser lenses FR and FL in the direction toward the center of image plane, and others, the asymmetry is more enhanced. Thus, an imbalance occurs in the illuminances on the light receiving portions PLH1 and PLH2 because of the difference in the magnifications of the paired refocusing optical systems and the imbalance in the quantities of light.

Therefore, the pixel width HRLH1 of the light receiving portion PLH1 of the paired light receiving portions PLH1 and PLH2 for the focus detection area ALH in the longer side direction in the image plane is defined to be greater than the pixel width HRLH2 of the light receiving portion PLH2, thereby to compensate the illuminance imbalance due to the asymmetry of the refocusing optical systems for the focus detection areas set in the radial directions in the circumference on the image plane.

In the circumference of the image plane, not only the optical capability of the photographing optical system is lowered, but also the refocusing capability of the peripheral focus detection optical system is inferior to that of the central focus detection optical system because the former is not on the optical axis AX of the photographing optical system.

Therefore, the pixel pitches KRLH1, KRLH2, and KRLV of the light receiving portions PLH1, PLH2, PLV1, and PLV2 on the left-hand side in the image plane is defined to be finer than the pixel pitches KCH and KCV of the light receiving portions PCH1, PCH2, PCV1, and PCV2 in the center of the image plane, thereby to improve the focus detection precision to compensate the lowered optical capability of the focus detection optical systems for the circumference of the image plane.

The asymmetry of the focus detection optical systems in the radial directions from the center of the image plane (here, in the longer side direction in the image plane) is greater than that of the focus detection optical systems in the direction of the contacting line of the center of the image plane and concentric circles (here, in the shorter side direction in the image plane). Accordingly, its optical capability is inferior.

Therefore, the pixel pitches KRLH1 and KRLH2 of the light receiving portions PLH1 and PLH2 for the focus detection area ALH in the longer side direction on the left-side hand in the image plane is defined to be smaller than the pixel pitch KRLV of the light receiving portions PLV1 and PLV2 for the focus detection area ALV in the shorter side direction on the left-hand side in the image plane, thereby to improve the focus detection precision for the compensation of the imbalance of the optical capability of the focus detection optical systems due to the setting directions of the focus detection areas in the circumference of the image plane.

When a focus detection is performed in the radial directions form the center of the image plane in the circumference of the image plane, a pair of the focus detection refocusing optical systems are arranged asymmetrically with respect to the optical axis of the photographing optical system as shown in FIG. 6, and due to the deflection of the optical axis of the condenser lens toward the center of the image plane and others, the asymmetry becomes more enhanced. Because of an asymmetry such as this, the magnifications of the paired refocusing optical systems are caused to present a difference. Accordingly, an imbalance occurs in the images to be formed on the light receiving portions PLH1 and PLH2.

Therefore, the pixel pitch KRLH1 of the light receiving portion PLH1 of the paired light receiving portions PLH1 and PLH2 for the focus detection area ALH in the longer side direction on the left-hand side in the image plane is defined to be finer than the pixel pitch KRLH2 of the light receiving portion PLH2 in order to improve the focus detection precision, thereby to compensate the imbalance in the optical capabilities due to the asymmetry of the focus detection optical systems for the focus detection areas set in the radial directions in the circumference of the image plane.

Thus, by setting the pixel pitches and pixel widths of each of the light receiving portions on the sensor SNS for the compensation of the lowered capability of the optical systems, it is possible to correct the imbalanced illuminance of the light receiving portions when objects having almost the same illuminance levels are captured by the focus detection areas in the center and circumference. As a result, it is possible to obtain the output signals of the respective light receiving portions at the regulated output levels by substantially the same periods of the charge storage. Hence, the output signal process for the sensor SNS becomes easier while the focus detection precision can be regulated both for the center and circumference of the image plane.

In the above-mentioned embodiment, the lowered optical capability is compensated by making the pixel pitches fine. On the contrary, however, it may also be possible to improve the process speed by making the pixel pitches for the lowered optical capability rough while reducing the pixel number in that portion.

Figure 21:
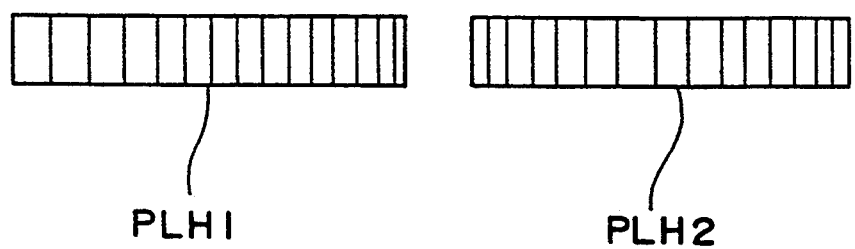
FIG. 21 is a view illustrating an example in which a part of the light receiving portions on the sensor shown in FIG. 19 is set to correct the distortion of the focus detection optical system.

FIG. 21 shows another setting example of the pixel pitches and pixel widths of the paired light receiving portions PLH1 and PLH2 for the focus detection area ALH shown in FIG. 18.

When a focus detection is performed in the radial directions from the center of the image plane in the circumference of the image plane, a pair of the focus detection refocusing optical systems are arranged asymmetrically with respect to the optical axis AX of the photographing optical system as shown in FIG. 6, and due to the deflection of the optical axis of the condenser lens toward the center of the image plane, and others, the asymmetry becomes more enhanced. Because of an asymmetry of the kind, the distortion characteristics of the paired refocusing systems become imbalanced as shown in FIGS. 7A and 7B.

Therefore, the pixel pitches of the light receiving portion PLH2 of the paired light receiving portions PLH1 and PLH2 for the focus detection area ALH in the longer side direction in the left-hand side in the image plane are varied for the respective locations in accordance with the distortion characteristics of the refocusing system for the light receiving portion PLH2 and at the same time, the pixel pitches of the light receiving portion PLH1 are varied for the respective locations in accordance with the distortion characteristics of the refocusing system for the light receiving portion PLH1. Hence, it becomes possible to compensate the imbalanced optical capabilities due to the asymmetry of the paired refocusing systems for the focus detection areas set in the radial directions from the center of the image plane in the circumference of the image plane as shown in FIG. 6. Consequently, the focus detection precision in the circumference of the image plane can be improved.

Figure 22:
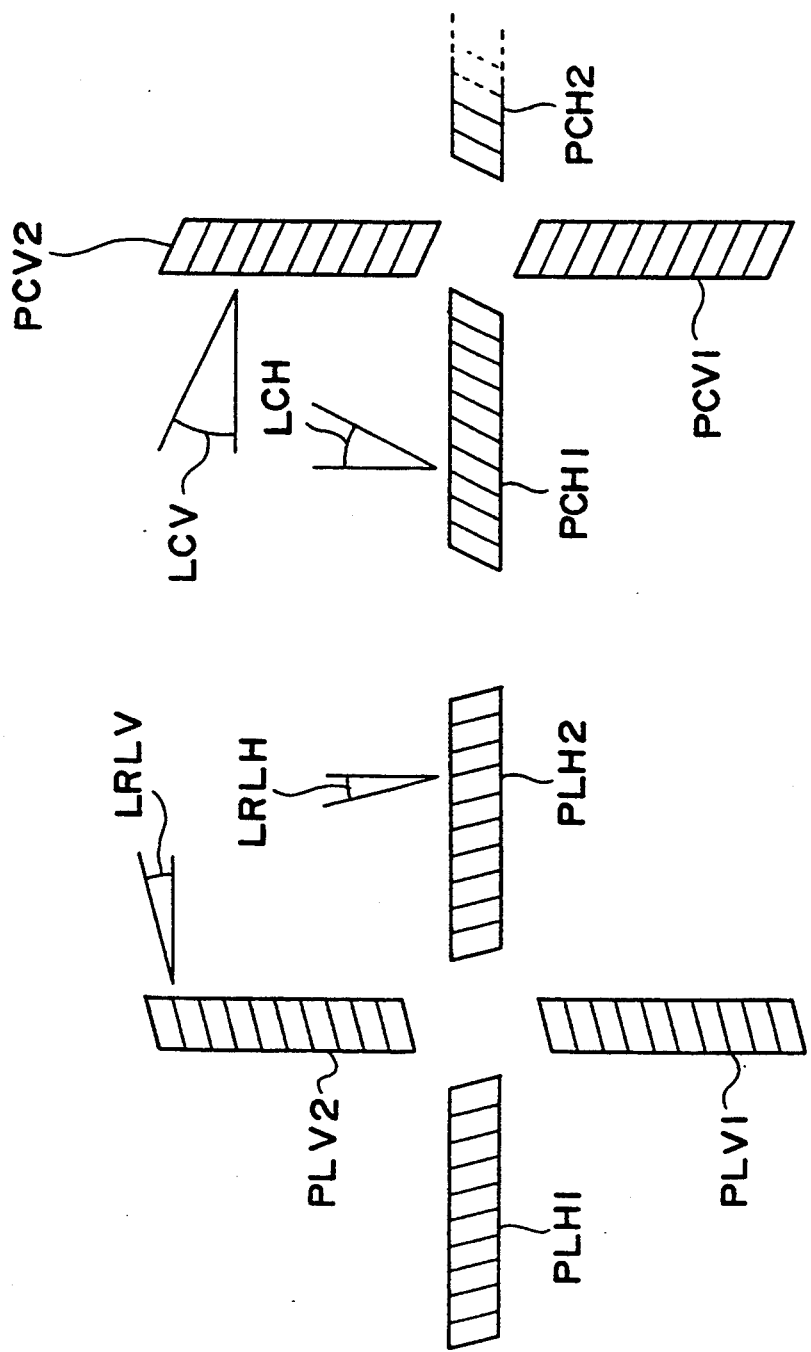
FIG. 22 is a view illustrating an example in which each of the pixels of the respective light receiving portions on the sensor shown in FIG. 19 is set slantingly.

FIG. 22 shows another setting example of the light receiving portions on the sensor SNS for the focus detection areas shown in FIG. 18. In this respect, the light receiving portions PRH1, PRH2, PRV1, and PRV2 for the focus detection areas ARH and ARV in the right-hand side in the image plane are symmetrical to the center line of the sensor SNS in the lateral direction. Thus, the representation thereof by drawing and the description thereof are omitted.

The light receiving portions PCV1 and PCV2 for the focus detection area ACV set in the shorter side direction in the center of the image plane have a slanting angle LCV for the pixels thereof. The light receiving portions PCH1 and PCH2 for the focus detection area ACH set in the longer side direction in the center of the image plane have a slanting angle LCH for the pixels thereof. The light receiving portions PLV1 and PLV2 for the focus detection area ALV set in the shorter side direction in the image plane on the left hand side in the image plane have a slanting angle LRLV for the pixels thereof. The light receiving portions PLH1 and PLH2 for the focus detection area ALH set in the longer side direction in the image plane on the left hand side in the image plane have a slanting angle LRLH for the pixels thereof.

Traditionally, when the refocusing performance is desirable, there is generally a tendency that the high frequency components of an image adversely affect the focus detection precision, and there is known a technique that such high frequency components are cut optically by slanting the pixels. Usually, however, the optical capability of a photographing optical system is lowered in the circumference of the image plane and at the same time, the refocusing capability is inferior to that of the focus detection optical system in the center because the peripheral focus detection optical system is not on the optical axis AX of the photographing optical system. Accordingly, the high frequency components have already been cut considerably and if the slanting of the pixels in the light receiving portions for the peripheral focus detection areas is set at the same slanting angle for the central focus detection area, the focus detection precision becomes degradated.

Therefore, the slanting direction of the pixels of the light receiving portions PCH1 and PCH2 for the focus detection area ACH in the longer side direction in the image plane in the center of the image plane and the slanting direction of the pixels of the light receiving portions PLH1 and PLH2 for the focus detection area ALH in the longer side direction in the image plane on the left-hand side in the image plane are set to be relatively different. On the other hand, the slanting direction of the pixels of the light receiving portions PCV1 and PCV2 for the focus detection area ACV in the shorter side direction in the image plane in the center of the image plane and the slanting direction of the pixels of the light receiving portions PLV1 and PLV2 for the focus detection area ALV in the shorter side direction in the image plane on the left-hand side in the image plane are set to be relatively different.

The slanting angles LRLH and LRLV of the pixels of the light receiving portions PLH1, PLH2, PLV1 and PLV2 in the left-hand side in the image plane are defined to be smaller than the slanting angle LCH and LCV of the pixels of the light receiving portions PCH1, PCH2, PCV1 and PCV2 in the center of the image plane in order to improve the focus detection precision. Hence compensating the lowered optical capability of the peripheral focus detection optical system.

When a focus detection is performed in the radial direction from the center of the image plane, the focus detection optical systems in the radial directions (here, in the longer direction in the image plane) have a larger asymmetry than the focus detection optical systems in the direction of the contacting lens of the center of the image plane and concentric circles (here, in the shorter side direction in the image plane) and the refocusing capability is also inferior. Therefore, the high frequency components have already been cut considerably. Accordingly, if the slanting angles of the pixels of the light receiving portions for the focus detection areas in the radial directions are made the same as the slanting angles of the pixels of the light receiving portions for the focus detection areas in the direction of the contacting line, the focus detection precision becomes degraded.

Therefore, the slanting angle LRLH of the pixels of the light receiving portions PLH1 and PLH2 for the focus detection area ALH in the longer side direction in the image plane on the left-hand side in the image plane is defined to be smaller than the slanting angle LRLV of the pixels of the light receiving portions PLV1 and PLV2 for the focus detection area ALV in the shorter side direction in the image plane on the left-hand side in the image plane in order to improve the focus detection precision. Hence compensating the lowered optical capability of the focus detection optical systems due to the arrangement direction of the focus detection areas in the circumference of the image plane.

Also, in the center and circumference of the photographing image plane, it is possible to perform a focus detection in the focus detection areas either in the center or in the circumference by setting the slanting directions of the pixels for the focus detection areas arranged in the same directions different from each other even when the objective pattern is slanted in anyway. In other words, while the technique to cut the high frequency components optically by slanting the pixels is used for obtaining highly precise detection result, this technique does not work when the objective image is slanted at a same angle as the slanting angle of the pixels. Therefore, by setting the slanting directions of the pixels different for the focus detection areas in the center and circumference so that the high frequency components of such an object are cut on the light receiving portions either in the center or in the circumference for the performance of the highly precise focus detection.

In this way, the slanting angles of the pixels of the light receiving portions for the focus detection areas in the center and circumference are set different from each other. It is therefore possible to regulate the focus detection precisions in the center and circumference of the image plane as well as the focus detection precisions of the focus detection areas in the direction of the contacting line in the circumference and in the radial directions evenly.

In this respect, it is possible to obtain the same effect by slanting only the pixels of the light receiving portions for the central focus detection areas without slanting the pixels of the light receiving portion for the peripheral focus detection areas.

Figure 23:
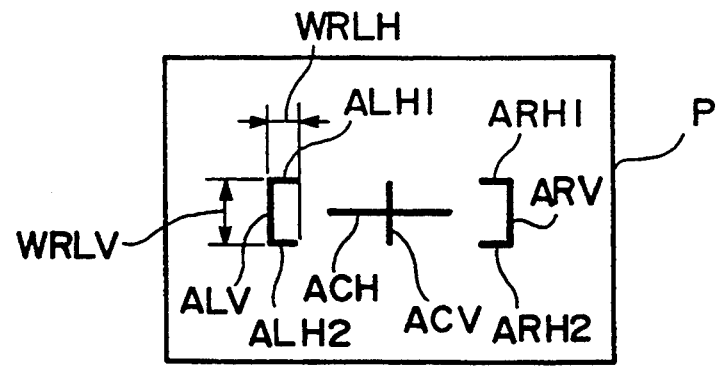
FIG. 23 is a view illustrating a setting example of the focus detection areas having other shapes.

FIG. 23 illustrates another setting example of the focus detection areas. Here, the arrangement of the focus detection area in the center of the image plane is the same as the arrangement of the central focus detection area shown in FIG. 18. The description will be made mainly of the points which differ from the example shown therein.

While the focus detection areas ACH and ACV form a cross type focus detection area, the focus detection areas ARH1, ARH2, ARV, ALH1, ALH2, and ALV form shapes [and] respectively. The focus detection areas ACH and ACV, focus detection areas ARH1, ARH2, and ARV, and focus detection areas ALH1, ALH2, and ALV intersect at right angles with each other, respectively. The focus detection area ACH is set in the longer side direction in the center of the image plane. The focus detection areas ARH1 and ARH2 are set in the longer side direction on the right-hand side in the image plane while the focus detection areas ALH1 and ALH2 are set in the longer side direction on the left-hand side in the image plane. Further, the focus detection area ACV is set in the shorter side direction in the center of the image plane, and the focus detection areas ARV and ALV are respectively set in the shorter side direction on the left-hand and right-hand sides in the image plane.

For the performance of a highly precise focus detection, the length WRLH of the focus detection areas ARH1, ARH2, ALH1, and ALH2 set on the left-hand and right-hand sides in the image plane and the length WRLV of the focus detection areas ARV and ALV are defined to be shorter than the lengths WCH and WCV of the focus detection areas ACH and ACV. Also, the length WRLH of the focus detection areas ALH1, ALH2, ARH1, and ARH2 set in the radial directions form the center of the image plane (here, in the longer side direction in the image plane) is defined to be shorter than the length WRLV of the focus detection areas ALV and ARV set in the direction of the contacting line of the center of the image plane and concentric circles on the left-hand and right-hand sides in the image plane (here, in the shorter side direction in the image plane).

When the focus detection areas are set in the locations other than the center of the image plane as in this case, the length of the focus detection areas set in the radial directions from the center of the image plane is defined to be shorter than the length of the focus detection areas in the direction of the contacting line of the center of the image plane and concentric circles. Hence preventing the degradation of the focus detection precision as described above.

Figure 24:
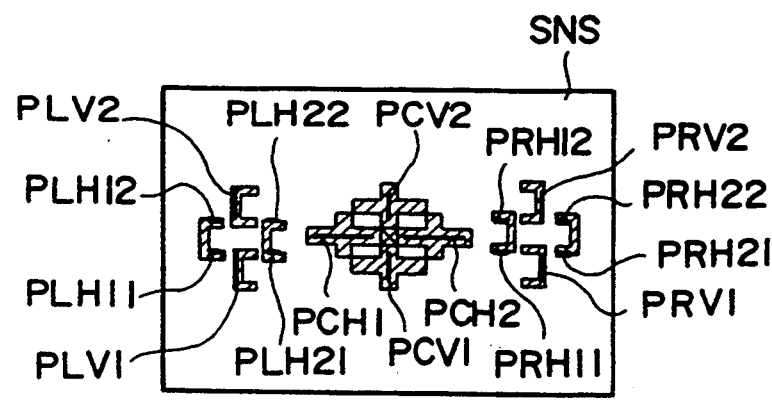
FIG. 24 is a view showing the relationship between the arrangement of the light receiving portions on a sensor for each of the focus detection areas shown in FIG. 23 and the secondary objective images.

FIG. 24 illustrates the relationship between the arrangements of the light receiving portions PRH11, PRH12, PRH21, PRH22, PRV1, PRV2, PCH1, PCH2, PCV1, PCV2, PLH11, PLH12, PLH21, PLH22, PLV1, and PLV2 on the sensor SNS for the focus detection areas shown in FIG. 23 and the secondary objective images.

The light receiving portions PRH11 and PRH12, PRH21 and PRH22, PRV1 and PRV2, PCH1 and PCH2, PCV1 and PCV2, PLH11 and PLH12, PLH21 and PLH22, and PLV1 and PLV2 make the respective pairs for the focus detection areas ARH1, ARH2, ARV, ACH, ACV, ALH1, ALH2, and ALV. The objective images formed in the respective focus detection areas are refocused on the corresponding pair of the light receiving portions as a pair of secondary objective images, respectively. The secondary objective images are formed within reflected regions having the shapes indicated by slanting lines in FIG. 24.

In this way, the focus detection areas on the left-hand and right-hand sides in the image plane are shaped [and], a nesting structure is formed in the adjacent light receiving portions (PLH21 and PLH22, and PCH1, PCH2 and PRH11, and PRH12) between the central focus detection areas and the left-hand and right-hand sides focus detection areas. Accordingly, the focus detection areas do not receive the secondary objective images of the other focus detection areas from each other even when the gaps between the light receiving portions are narrow. Therefore, as compared with the focus detection areas shown in FIG. 18, the chip size of the sensor SNS can be made small, leading to the implementation of the manufacturing cost reduction.

Figure 25:
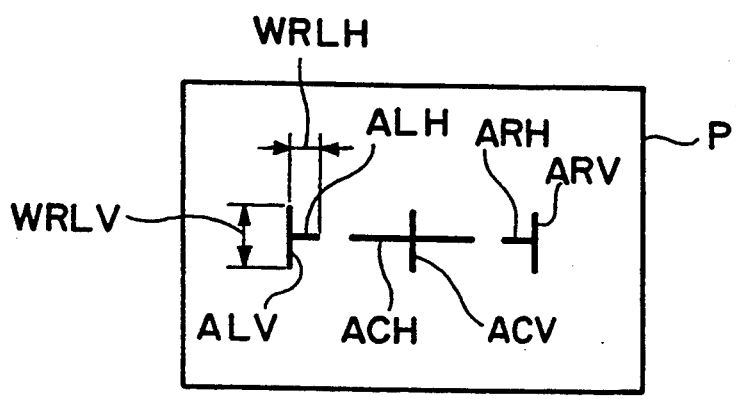
FIG. 25 is a view illustrating a setting example of the focus detection areas having other shapes.

FIG. 25 illustrates another setting example of the focus detection areas. In this respect, the focus detection areas ACH, and ACV set in the center of the image plane are the same as the focus detection areas shown in FIG. 18. Therefore, the description will be made mainly of the points which differ therefrom.

The focus detection areas ACH and ACV form a cross type focus detection area while the focus detection areas ARH, ARV, ALH, and ALV form detection areas having the shapes     and    . The focus detection areas ACH and ACV, ARH and ARV, and ALH and ALV intersect with right angles with each other. The focus detection area ACH is set in the longer side direction in the center of the image plane while the focus detection areas ARH and ALH are set respectively in the longer side direction on the left-hand and right-hand sides in the image plane. The focus detection area ACV is set in the shorter side direction in the center of the image plane while the focus detection areas ARV and ALV are respectively set in the shorter side direction on the left-hand and right-hand sides in the image plane.

For the performance of a highly precise focus detection, the length WRLH of the focus detection areas ARH and ALH set in on the left-hand and right-hand side in the image plane and the length WRLV of the focus detection areas ARV and ALV are defined to be shorter than the lengths WCH and WCV of the focus detection areas ACH and ACV set in the center of the image plane. Also, the length WRLH of the focus detection areas ALH and ARH set in the radial directions form the center of the image plane (here, in the longer side direction in the image plane) is defined to be shorter than the length WRLV of the focus detection areas ALV and ARV set in the direction of the contacting line of the center of the image plane on the left-hand and right-hand sides in the image plane and concentric circles (here, in the shorter direction in the image plane).

Thus, when the focus detection areas are set in the locations other than the center of the image plane, the length of the focus detection areas set in the radial directions from the center of the image plane is defined to be shorter than the length of the focus detection areas set in the direction of contacting line of the center of the image plane and concentric circles. Hence preventing the degradation of the focus detection precision as described above. Also, the left-hand and right-hand side focus detection areas are shaped    and    . As a result, it becomes possible to perform focus detections both in the vertical and horizontal direction at the left-hand and right-hand ends in the photographing image plane P. Thus, the objects positioned in the vicinity of the left-hand and right-hand ends in the image plane can be captured by either one of the focus detection areas assuredly for the required focus detection.

Figure 26:
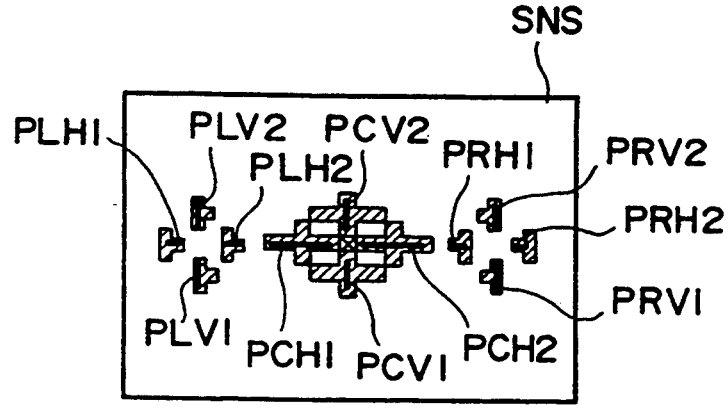
FIG. 26 is a view showing the relationship between the arrangement of the light receiving portions on a sensor for each of the focus detection areas shown in FIG. 25 and the secondary objective images.

FIG. 26 illustrates the relationship between the light receiving portions PRH1, PRH2, PRV1, PRV2, PCH1, PCH2, PCV1, PCV2, PLH1, PLH2, PLV1, and PLV2 on the sensor SNS for the focus detection areas shown in FIG. 25 and the secondary objective images.

The light receiving portions PRH1 and PRH2, PRV1 and PRV2, PCH1 and PCH2, PCV1 and PCV2, PLH1 and PLH2, and PLV1 and PLVE make the respective pairs for the focus detection areas ARH, ARV, ACH, ACV, ALH, and ALV. The objective images formed in the respective focus detection areas are refocused respectively on the pair of the light receiving portions as a pair of the secondary objective images. The secondary objective images are formed in the ranges having the reflected shapes of the focus detection areas indicated by slanting lines in FIG. 16.

Figure 27:
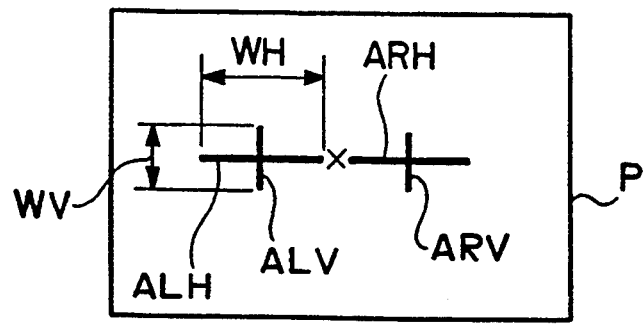
FIG. 27 is a view illustrating another setting example of the cross type focus detection areas.

The focus detection areas on the left-hand and right-hand sides are shaped    and    . Therefore, as compared with the light receiving portion settings on the sensor SNS shown in FIG. 19, the positions of the light receiving portions positioned at the left-hand and right-hand ends on the sensor SNS can be shifted toward the center. As a result, the chip size can be made smaller than the sensor SNS shown in FIG. 19, hence enabling the reduction of the manufacturing cost. FIG. 27 illustrates another setting example of the focus detection areas.

The focus detection areas ARH, ARV, ALH, and ALV intersect at right angles with each other to form cross type focus detection areas. The focus detection areas ARH and ALH are set in the longer side direction in the image plane on the left-hand and right-hand sides in the image plane while the focus detection areas ARV and ALV are set in the shorter side direction in the image plane on the left-hand and right-hand side in the image plane. These two cross type focus detection areas are arranged in the longer side direction in the image plane on the straight line running in the center of the image plane and are set symmetrically to the center of the image plane. Also, the length WH of the focus detection areas ALH and ARH set in the radial directions from the center of the image plane (here, in the longer side direction in the image plane) is defined to be longer than the length WV of the focus detection areas ALV and ARV set in the direction of the contacting line of the center of the image plane on the left-hand and right-hand sides in the image plane and concentric circles (here, in the shorter direction in the image plane).

Thus, by setting the two cross type focus detection areas in the locations other than the center of the photographing image plane P, it is possible to perform the focus detections efficiently with a small number of focus detection areas. Also, the two cross type focus detection areas are arranged in the longer side direction in the image plane and still more, the length WH of the focus detection areas ALH and ARH which are in parallel to the direction in which these cross type focus detection areas are arranged is defined to be longer than the length of the other focus detection areas ALV and ARV. Consequently, the focus detection can be performed with almost no gap in the longer side direction in the image plane. In this way, it is possible to capture with these cross type focus detection areas at all times the principal object positioned in the longer side direction in the image plane in the locations other than the center of the image plane (for example, a face or the like of a bust shot with a vertically positioned photographing) or an object which is traveling in the longer side direction of the image plane. Furthermore, the two cross type focus detection areas are set symmetrically to the center of the image plane. Accordingly, irrespective of the camera postures (a vertical inversion at the time of a vertically positioned photographing), it is always possible to operate the focus detections with the same way of using a camera.

Also, when a photographing light beam is deflected in the direction by a sub-mirror toward the bottom of a mirror box to provide a focus detection module at the bottom of the body, there is an advantage that a more freedom is obtainable for constructing the sub-mirror and arranging a space for the focus detection module if the focus detection areas are arranged in the longer side direction in the image plane.

Figure 28:
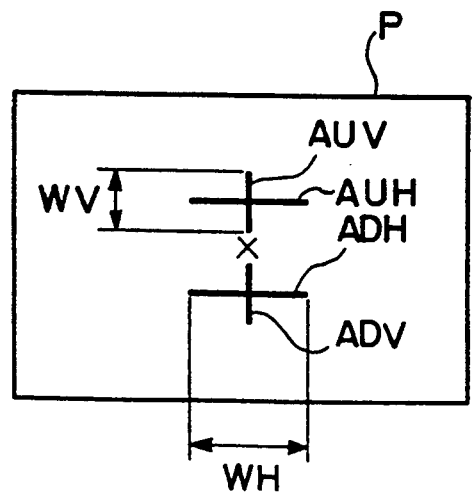
FIG. 28 is a view illustrating another setting example of the cross type focus detection areas.

FIG. 28 illustrates another setting example of the focus detection areas.

The focus detection areas AUH, AUV, ADH, and ADV intersect at right angles with each other to form cross type focus detection areas. The focus detection area AUH and ADH are set in the longer side direction at the upper and lower parts in the center of the image plane. The focus detection areas AUV and ADV are set in the shorter side direction at the upper and lower parts in the center of the image plane. These two cross type focus detection areas are arranged in the shorter side direction on the straight line running through the center of the image plane and are set symmetrically to the center of the image plane. Also, the length WH of the focus detection areas AUH and ADH set in the direction of the contacting line of the center of the image plane and concentric circles (here, in the longer side direction in the image plane) is defined to be longer than the length WV of the focus detection areas AUV and ADV set in the radial direction from the center of the image line (here, in the shorter side direction in the image plane) at the upper and lower parts of the center of the image plane.

Thus, by setting the two cross type focus detection areas in the locations other than the center of the image plane, it is possible to perform focus detections efficiently with a small number of the focus detection areas. Also, the two cross type focus detection areas are arranged in the shorter side direction in the image plane. Hence enabling focus detections in the shorter side direction with almost no gap. It is therefore possible to capture with these focus detection areas at all times the principal object positioned in the shorter side direction in the image plane in the locations other than the center of the image plane (for example, a face, eyes or the like of a bust shot with a vertically positioned photographing) or an object which is traveling in the shorter side direction of the image plane. Furthermore, the two cross type focus detection areas are set symmetrically to the center of the image plane. Accordingly, irrespective of the camera postures (a vertical inversion at the time of a vertically positioned photographing), it is always possible to operate the focus detections with the same way of using a camera. Also, when the focus detection areas are set in the locations other than the center of the image plane, the length of the focus detection areas set in the radial directions from the center of the image plane is defined to be shorter than the length of the focus detection areas set in the direction of the contacting line of the center of the image plane and concentric circles. Hence preventing the degradation of the focus detection precision as described above.

Figure 29:
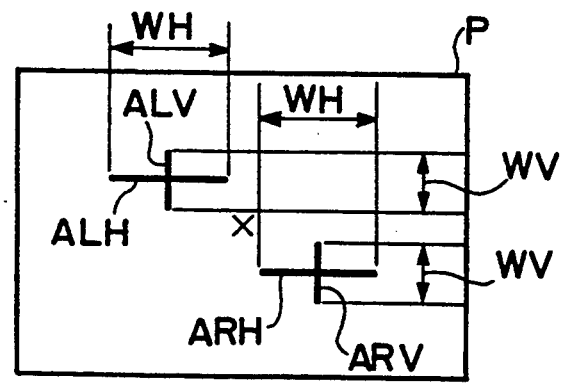
FIG. 29 is a view illustrating another setting example of the cross type focus detection areas.

FIG. 29 illustrates another setting example of the focus detection areas.

The focus detection area ARH, ARV, ALH, and ALV intersect at right angles with each other to form cross type focus detection areas. The focus detection areas ARH and ALH are set in the longer side direction in the image plane on the left-hand and right-hand sides in the image plane. The focus detection areas ARV and ALV are set in the shorter side direction in the image plane on the left-hand and right-hand sides in the image plane. These two cross type focus detection areas are arranged in the diagonal direction on the straight line running through the center of the image plane and are set symmetrically to the center of the image plane. Also, the length WH of the focus detection areas ALH and ARH is defined to be longer than the length WV of the focus detection areas ALV and ARV set in the shorter direction on the left-hand and right-hand sides in the image plane.

Thus, by setting the two cross type focus detection areas in the locations other than the center of the image plane, it is possible to perform focus detections efficiently with a small number of the focus detection areas. Also, the two cross type focus detection areas are arranged in the diagonal direction in the image plane and still more the length WH of the focus detection areas ALH and ARH set in the longer side direction in the image plane is defined to be longer than the length WV of the focus detection areas ALV and ARV set in the shorter side direction in the image plane. Consequently, the projections of the longer side direction and shorter side direction of the two cross type focus detection areas are not overlapped with each other. Furthermore, the projected portions in the longer side direction in the image plane are longer than those in the shorter side direction. It is therefore possible to perform focus detections efficiently in an image plane with different vertical and horizontal lengths and at the same time, to improve the complementing capabillity for vertical and horizontal objective patterns. Also, the two cross type focus detection areas are set symmetrically to the center of the image plane. It is therefore possible to operate focus detections with the same way of using a camera irrespective of the camera postures (vertical inversion at the time of a vertically positioned photographing).

Figure 30:
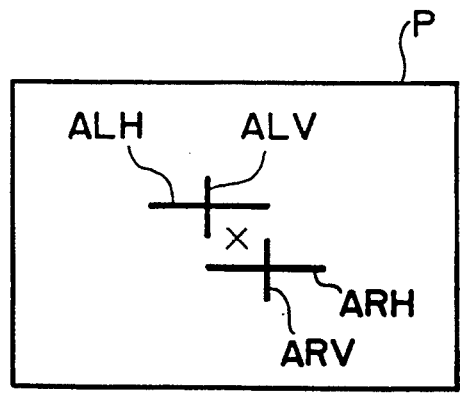
FIG. 30 is a view showing an example of the variation of the cross type focus detection areas shown in FIG. 29.

FIG. 30 illustrates another setting example of the focus detection areas.

The focus detection areas ARH, ARV, ALH, and ALV intersect at right angles with each other to form the cross type focus detection areas. The focus detection areas ARH and ALH are set in the longer side direction in the image plane on the left-hand and right-hand side in the image plane. The focus detection areas ARV and ALV are set in the shorter direction in the image plane on the left-hand and right-hand sides in the image plane. These two cross type focus detection areas are arranged in the diagonal direction more closely on the straight line running through the center of the image plane than the cross type focus detection areas shown in FIG. 19 and are set symmetrically to the center of the image plane. Also, the length of the focus detection areas ALH and ARH set in the longer side direction in the image plane is defined to be longer than the length of the focus detection areas ALV and ARV set in the shorter side direction in the image plane on the left-hand and right-hand sides in the image plane.

Thus, by setting the two cross type focus detection areas in the locations other than the center of the image plane, it becomes possible to perform focus detections in the image plane with a small number of the focus detection areas. Also, the center of the image plane is almost surrounded by the four focus detection areas. Accordingly, even in the photographing composition where a principal object is positioned in the center of the image plane, the object is captured by either one of the four focus detection areas. Hence enabling the performance of the focus detections assuredly. In other words, even when a focus detection area is not set in the center of the image plane, the focusing of an object positioned in the center of the image plane can be performed at a level which does not present any problem practically. Furthermore, the two cross type focus detection areas are set symmetrically to the center of the image plane, it is possible to operate focus detections with the same way of using a camera irrespective of the camera postures (vertical inversion at the time of a vertically positioned photographing).

Figure 31:
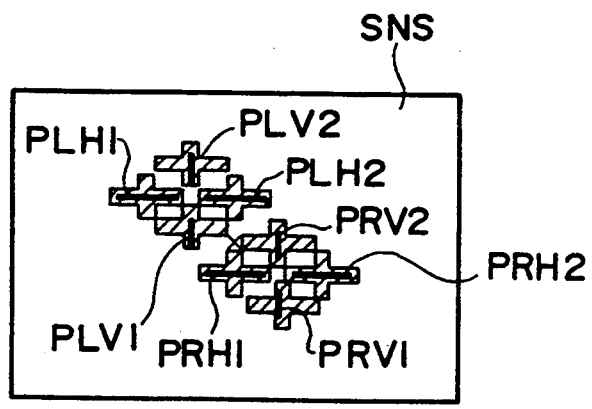
FIG. 31 is a view showing the relationship between the arrangement of the light receiving portions on a sensor for the cross type focus detection areas shown in FIG. 30 and the secondary objective images.

FIG. 31 illustrates the relationship between the arrangements of the light receiving portions PRH1, PRH2, PRV1, PRV2, PLH1, PLH2, PLV1, and PLV2 on the sensor SNS for the focus detection areas shown in FIG. 30 and the secondary objective images.

The light receiving portions PRH1 and PRH2, PRV1 and PRV2, PLH1 and PLH2, and PLV1 and PLV2 made the respective pairs for the focus detection areas ARH, ARV, ALH, and ALV. The objective images formed in the respective focus detection areas are refocused on the respective pair of the light receiving portions as a pair of the secondary objective images. The secondary objective images are formed in the regions of the reflected shapes of the focus detection areas indicated by the slanting lines in FIG. 31.

Thus, the two cross type focus detection areas are arranged on the diagonal line in the image plane, and as compared with the arrangements on the straight line in the longer side direction or shorter side direction in the image plane, the circumscribing polygonal areas of the light receiving portions on the sensor SNS can be made small, thereby to make the chip size of the sensor SNS smaller. Hence leading to the implementation of the manufacturing cost reduction.

Figure 32A:
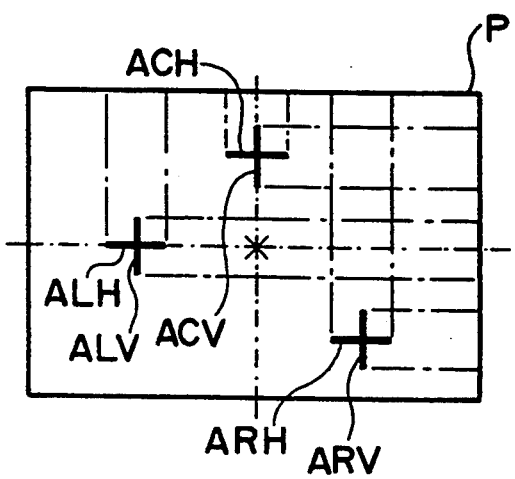
FIG. 32A is a view illustrating another setting example of the three cross type focus detection areas.

FIG. 32A illustrates another setting example of the focus detection areas.

The focus detection areas ARH, ARV, ACH, ACV, ALH, and ALV intersect at right angles with each other to for three cross type focus detection areas which are respectively set in the locations other than the center of the image plane in such a manner that they are not arranged on one straight line. The focus detection areas ALH and ALV are set at a position in the longer side direction in the image plane displaced toward the left-hand side from the center of the image plane. The focus detection areas ACH and ACV are set at a position in the shorter side direction displaced upward from the center of the image plane. The focus detection areas ARH and ARV are set at a position in the longer side direction toward the right-hand side from the center of the image plane and also displaced downward in the shorter direction. The focus detection areas ACH, ARH, and ALH are set in the longer side direction in the image plane while the focus detection areas ACV, ARV, and ALV are set in the shorter side direction in the image plane.

Figure 32B:
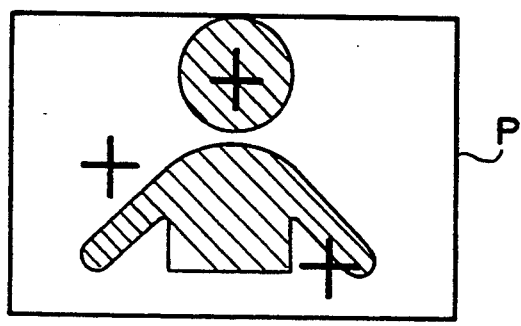
FIG. 32B is a view illustrating the relationship between the three focus detection areas shown in FIG. 32A and an objective person when a portrait photograph is taken.
Figure 33:
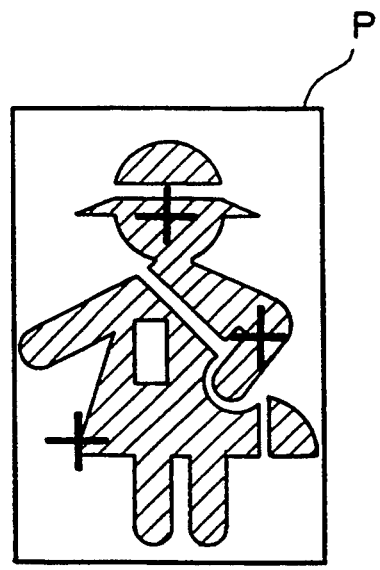
FIG. 33 is a view illustrating the relationship between the three focus detection areas shown in FIG. 32A and an objective person when a portrait photograph is taken with a camera postured at a vertical position.
Figure 34A:
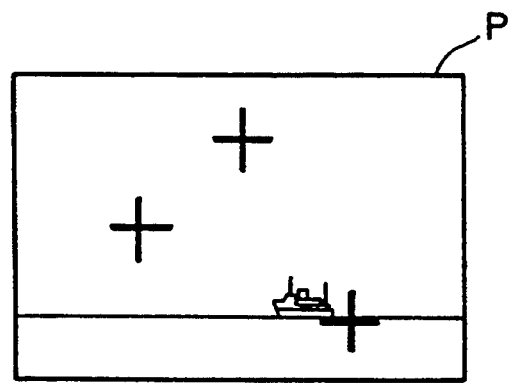
FIG. 34A is a view illustrating an example in which an object having vertical and horizontal patterns is photographed with the three cross type focus detection areas shown in FIG. 32A.
Figure 34B:
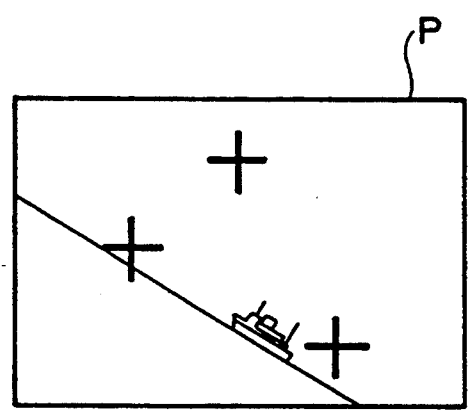
FIG. 34B is a view illustrating an example in which an object having slanting patterns is photographed with the three cross type focus detection areas shown in FIG. 32A.

In this way, the three cross type focus detection areas are efficiently arranged so that they are not aligned on one straight line in the image plane. Therefore, as shown in FIG. 32B, it is possible to perform a focus detection for the face of a person when a horizontal portrait photography is taken. Also, in taking a vertically positioned portrait photography, it is possible to perform a focus detection for the face of a person as shown in FIG. 33. Furthermore, the projections of the three focus detection areas in the longer side direction and shorter side direction in the image plane are set so as not to be overlapped with each other as shown in FIG. 32A. As a result, it is possible to capture efficiently an object having the vertical and horizontal patterns which exists often in the natural world statistically as shown in FIG. 34A. Also, the capturing probability for an object having a slanting pattern as shown in FIG. 34B, for example, is increased by either one of the plural focus detection areas. In this respect, while the projections of the focus detection areas are set so as not to overlapped with each other completely in the present embodiment, the same effects are also obtainable even if they are overlapped slightly. Further, the respective focus detection areas included in the three cross type focus detection areas are set either in the longer side direction or in the shorter side direction, but it is possible to set each of them so that they are not in parallel with each other.

Figure 35:
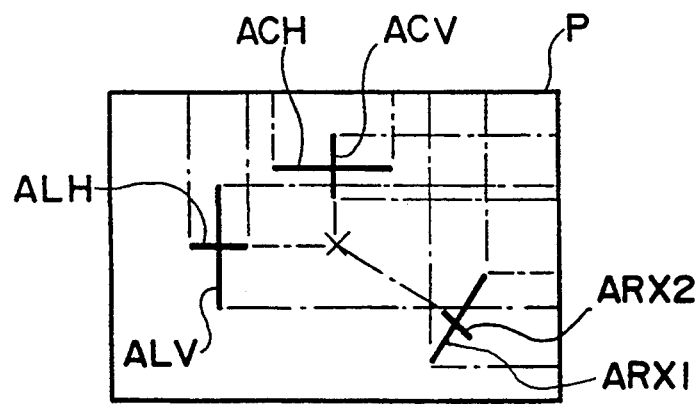
FIG. 35 is a view illustrating another setting example of the three cross type focus detection areas.

FIG. 35 illustrates another setting example of the focus detection areas.

The focus detection areas ARX1, ARX2, ACH, ACV, ALH, and ALV intersect at right angles with each other to form the three cross type focus detection areas which are arranged so that they are not aligned on one straight line in the locations other than the center of the image plane. The cross type focus detection areas ALH and ALV set at a position in the longer side direction in the image plane displaced toward the left-hand side from the center of the image plane. The cross type focus detection areas ACH and ACV are set at a position in the shorter side direction in the image plane displaced upward from the center of the image plane. The cross type focus detection areas ARX1 and ARX2 are set in the diagonal direction of the image plane displaced toward the lower right-hand side from the center of the image plane. The focus detection areas ACH and ALH are set in the longer side direction in the image plane while the focus detection areas ACV and ALV are set in the shorter direction in the image plane. The focus detection area ARX2 is set in the radial direction from the center of the image plane while the focus detection area ARX1 is set in the direction of the contacting line of the center of the image plane and concentric circles. Further, for the performance of the highly precise focus detections, the length of the focus detection areas ACV, ARX2 and ALH set in the radial directions is defined to be shorter than the length of the focus detection areas ACH, ALV, and ARX1 set in the direction of the contacting line of the center of the image plane in the locations other than the center of the image plane.

Thus, by setting the length of the focus detection areas set in the radial directions from the center of the image plane to be shorter than the length of the focus detection areas set in the direction of the contacting line of the center of the image plane and concentric circles in the locations other than the center of the image plane, it is possible to prevent the degradation of the focus detection precision as described above. Also, the three cross type focus detection areas are efficiently arranged so that they are not aligned on one straight line in the photographing image plane. Accordingly, it is possible to perform a focus detection for the face of a person assuredly when a portrait photography is taken at a vertical or horizontal position. Furthermore, the projections of the three cross type focus detection areas in the longer side direction and shorter side direction are set so as to make the overlapping portions less. Concequently, it is possible to capture efficiently an object having vertical and horizontal patterns which often exists in the natural world statistically. Also, for an object having slanting patterns, there is an increased probability to capture it with either one of the plural focus detection areas.

Figure 36:
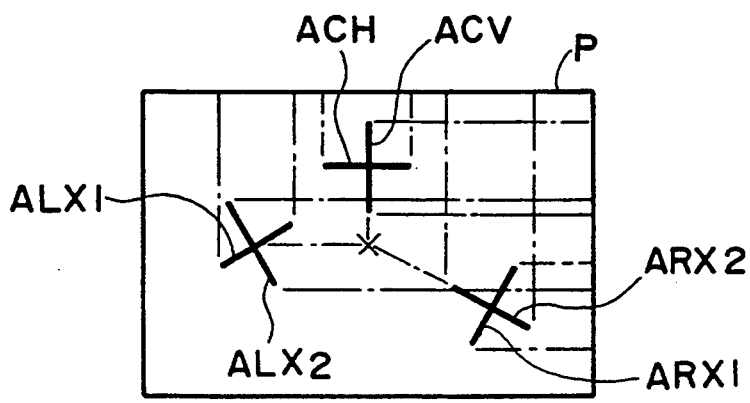
FIG. 36 is a view illustrating another setting example of the three cross type focus detection areas.

FIG. 36 illustrates another setting example of the focus detection areas.

The focus detection areas ARX1, ARX2, ACH, ACV, ALX1, and ALX2 intersect at right angles with each other to form the three cross type detection areas and are set in the locations other than the center of the image plane so as not to be aligned on one straight line. The cross type focus detection areas ALX1 and ALX2 are set at a position in the longer side direction displaced toward the left-hand side form the center of the image plane. The cross type focus detection areas ACH and ACV are set in the shorter side direction displaced upward from the center of the image plane. The cross type focus detection areas ARX1 and ARX2 are set in the diagonal direction in the image plane displaced toward the lower right-hand side. Further, the focus ACH is set in the longer side direction in the image plane while the focus detection area ACV is set in the shorter side direction in the image plane. The focus detection areas ARX1 and ARX2 are set in the diagonal direction in the image plane. Also, each of the focus detection areas ALX1, ALX2, ACH, ACV, ARX1, and ARX2 are set so that they are not in parallel with each other.

Thus, the three cross type focus detection areas are efficiently arranged so that they are not aligned on one straight line in the image plane. It is therefore possible to perform a focus detection for the face of a person when a portrait photography is taken at vertical and horizontal positions. Also, the projections of the three cross type focus detection areas in the longer side direction and shorter side direction in the image plane are set so as to make the overlapping portions less. It is therefore possible to capture efficiently an object having vertical and horizontal patterns which often exists in the natural world statistically. Also, for an object having slanting patterns, there is an increased probability to capture it with either one of the plural focus detection areas. Furthermore, each of the focus detection areas included in the three cross type focus detection areas is set so as not be in parallel with each other. Hence enabling the performance of a focus detection for an object having any angle.

Figure 37:
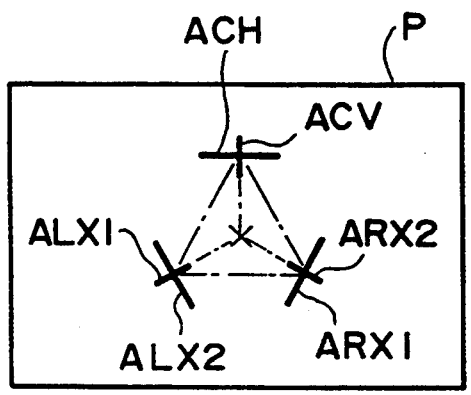
FIG. 37 is a view illustrating another setting example of the three cross type focus detection areas.

FIG. 37 illustrates another setting example of the focus detection areas.

The focus detection areas ARX1, ARX2, ACH, ACV, ALX1, and ALX2 intersect at right angles with each other to form the three cross type focus detection areas and are set at each of the vertices of the equilateral triangles the respective bases of which are in parallel with the longer side direction in the image plane with the center of the image plane as its center. The cross type focus detection areas ALX1 and ALX2 are set is set at position displaced toward the lower left-hand side from the center of the image plane. The cross type focus detection area ACH and ACV are set at a position in the shorter side direction displaced upward from the center of the image plane. The cross type focus detection areas ARX1 and ARX2 are set at a position displaced toward the lower right-hand side from the center of the image plane. The focus detection area ACH is set in the longer side direction in the image plane while the focus detection area ACV is set in the shorter direction in the image plane. The focus detection areas ALX1 and ARX2 are set in the direction of the line connecting the vertex of the triangle and the center of the image plane (in the radial direction from the center of the image plane), and the focus detection areas ALX2 and ARX1 are set in the direction of the contacting line of the center of the image plane and concentric circles. Also, for the performance of highly precise focus detections, the length of the focus detection areas ACV, ARX2, and ALX1 set in the radial directions from the center of the image plane is defined to be shorter than the length of the focus detection areas ACH, ALX2, and ARX1 set in the direction of the contacting line of the center of the image plane and concentric circles in the locations other than the center of the image plane.

In this way, by setting the length of the focus detection areas set in the radial directions from the center of the image plane to be shorter than the length of the focus detection areas set in the direction of the contacting line of the center of the image plane and concentric circles in the locations other than the center of the image plane, it is possible to prevent the degradation of the focus detection precision as described above. Also, the three cross type focus detection areas are efficiently arranged so as not be aligned on one straight line in the image plane. Hence enabling the performance of a focus detection for the face of a person assuredly even when a portrait photography is taken at vertical and horizontal positions. Also, there is an increased probability to capture an object having slanting patters either one of the plural focus detection areas. Furthermore, the respective focus detection areas included in the three cross type focus detection areas are set so as not to be in parallel with each other. Thus, it becomes possible to perform focus detections for the objective patterns of any angles.

Figure 38:
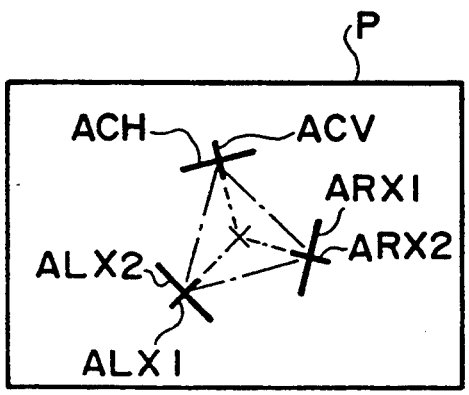
FIG. 38 is a view illustrating an example of the variation of the three cross type focus detection areas shown in FIG. 37.

FIG. 38 illustrates another setting example of the focus detection areas.

The focus detection areas are set by rotating the focus detection areas shown in FIG. 37 around the center of the image plane. As compared with the focus detection areas shown in FIG. 37, the projections of the three cross type focus detection areas in the longer side direction and shorter side direction in the image plane present the lesser portions which overlap with each other. By setting the focus detection areas in this way, it is possible to capture efficiently an object having vertical and horizontal patterns which often exists in the natural world statistically.

In this respect, the setting examples of the focus detection areas shown in the above-mentioned FIGS. 37 and 38 represent the arrangement of the three cross type focus detection areas set at each of the verticies of the equilateral triangles. However, this is not necessarily limited to the equilateral triangles. For example, it may be possible to adopt an isosceles triangle having one vertex which has been widened to have the cross type focus areas to be set in the image plane for a well balanced arrangement to match with the vertical and horizontal ratio of the image plane.

Figure 39:
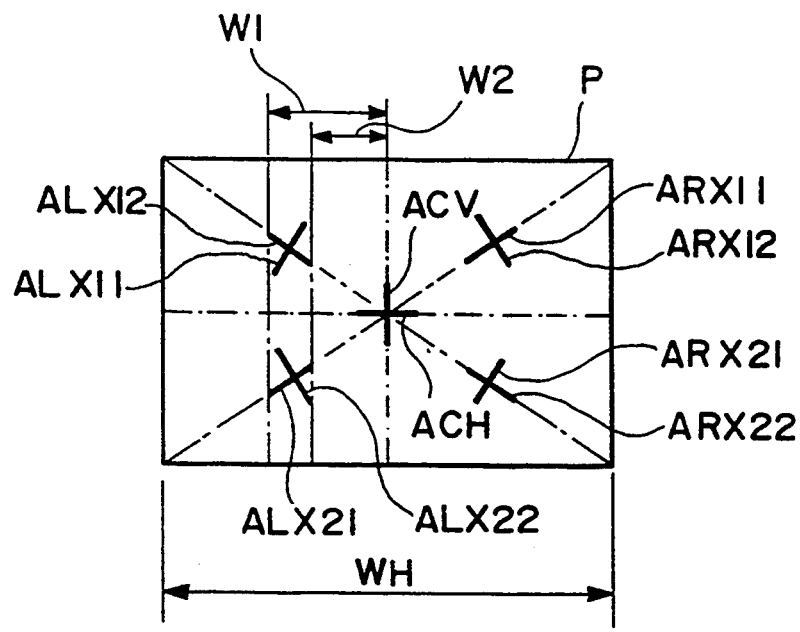
FIG. 39 is a view illustrating a setting example of five cross type focus detection areas.

FIG. 39 illustrates a setting example of the three or more cross type focus detection areas.

The focus detection areas ARX11, ARX12, ARX21, ARX22, ACH, ACV, ALX11, ALX12, ALX21, and ALX22 to form the respective cross type focus detection areas with each other. The focus detection areas ACH and ACV are set in the center of the image plane. The focus detection areas ARX11 and ARX12 are set on the diagonal line in the image plane at the upper right-hand side in the image plane. The focus detection area ALX21 and ALX22 are set on the diagonal line at lower left-hand side in the image plane. Further, the focus detection area ARX21 and ARX22 are set on the diagonal line at the upper lower right side in the image plane while the focus detection areas ALX11 and ALX12 are set on the diagonal line at the upper left-hand side in the image plane. The focus detection area ACH is set in the longer side direction in the image plane while the focus detection area ACV is set in the shorter side direction ill the image plane. The focus detection areas ARX11, ARX22, ALX12, and ALX21 are set in the radial directions from the center of the image plane, and the focus detection areas ARX12, ARX21, ALX11, and ALX21 are set in the direction of the contacting line of the center of the image plane and concentric circles. Also, the cross type focus detection areas ARX11 and ARX12, ARX21 and ARX22, ALX11 and ALX12, and ALX21 and ALX22 are arranged between the locations from W1 (=WH/4) from the center of the image plane to W2 (=WH/6) in the longer side direction in the image plane (here, WH is the length in the longer side direction in the image plane).

By setting the three or more cross type focus detection areas in the center of the photographing image plane and on both of the diagonal lines in the image plane in this way, it is possible to perform focus detections for a principal object assuredly no matter where such an principal object is positioned in the image plane. Further, the five cross type focus detection areas are efficiently arranged in the image plane, and the face of a person can be detected for focusing assuredly when a portrait photography is taken at vertical and horizontal positions. Also, there is an increased probability to capture an object having slanting patterns with either one of the plural focus detection areas. Each of the focus detection areas included in the two cross type focus detection areas of the five cross type focus detection areas is set so as not to be in parallel with each other. It is therefore possible to perform focus detections for objective patterns of any angles.

Figure 40:
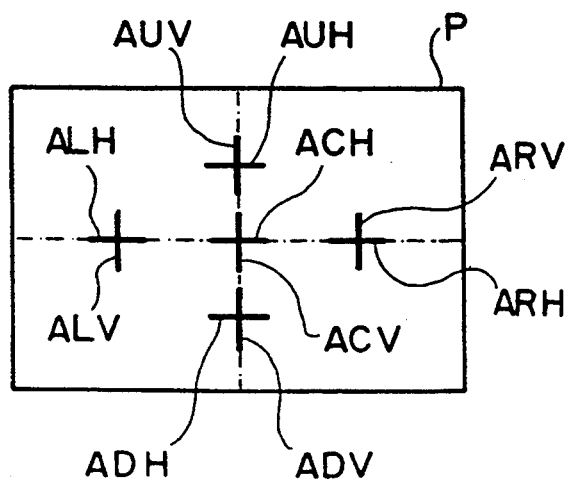
FIG. 40 is a view illustrating another setting example of the five cross type focus detection areas.

FIG. 40 illustrates another example of the focus detection areas.

The focus detection areas ARH, ARV, ALH, ALV, ACH, ACV, AUH, AUV, ADH, and ADV intersect at right angles with each other to form the cross type focus detection areas. The focus detection areas ACH and ACV are set in the center of the image plane and the focus detection areas ARH and ARV are set on the right-hand side in the image plane while the focus detection areas ALH and ALV are set on the left-hand side in the image plane. These focus detection areas ACH, ACV, ARH, and ARV are set in the longer side direction on one straight line running through the center of the image plane. The focus detection areas AUH and AUV are set at the upper part of the image plane while the focus detection areas ADH and ADV are set at the lower part of the image plane. The cross type focus detection areas AUH, AUV, ACH, ACV, ADH, and ADV are in the shorter side direction on one straight line running through the center of image plane. Further, the focus detection areas ACH, ARH, ALH, AUH, and ADH are set in the longer side direction in the image plane while the focus detection areas ACV, ARV, ALV, AUV, and ADV are set in the shorter side direction in the image plane. Also, the cross type focus detection areas ARH, ARV, ALH and ALV are arranged between the locations from W1 (=WH/4) in the center of the image plane to W2 (=WH/6) in the longer side direction in the image plane as in the case of the focus detection areas shown in FIG. 39 (here, WH is the length of the longer side direction in the image plane). The cross type focus detection areas AUH, AUV, ADH, and ADV are arranged between the locations from W1 (=WH/4) from the center of the image plane to W2 (=WH/6) in the shorter side direction of the image plane.

By setting the three or more cross type focus detection areas in the center of the image plane and on the vertical and horizontal center lines in the image plane, respectively, in this way, it is possible to perform focus detections for a principal object assuredly no matter where it is located in the image plane. Further, the five cross type focus detection areas are efficiently arranged in the image plane. It is therefore possible to perform focus detections assuredly for the face of a person when a portrait photography is taken at vertical and horizontal positions. Also, there is an increased probability to capture an object having slanting patterns with either one of the plural focus detection areas in the image plane.

Figure 41:
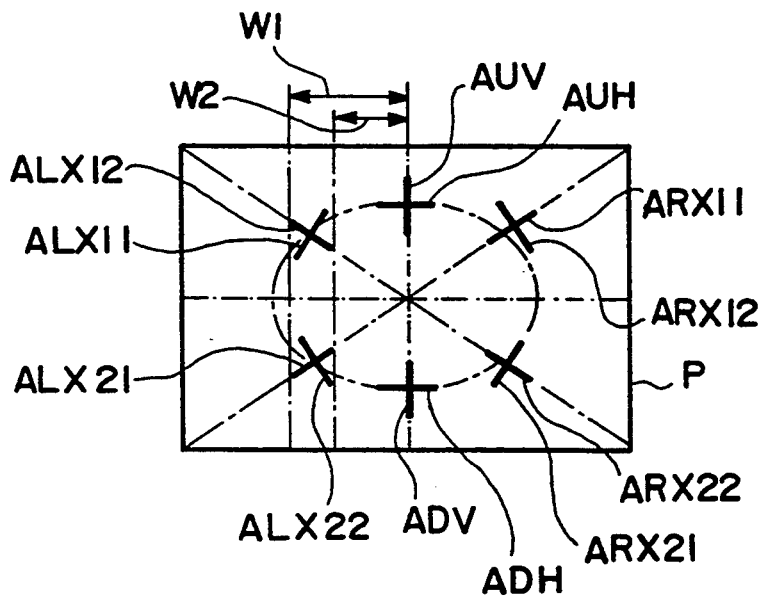
FIG. 41 is a view illustrating a setting example of six cross type focus detection areas.

FIG. 41 illustrates another setting example of the focus detection areas.

The focus detection areas ARX11, ARX12, ARX21, ARX22, ALX11, ALX12, ALX21, ALX22, AUH, AUV, ADH, and ADV intersect at right angles with each other to form the cross focus detection areas. The focus detection areas ARX11 and ARX12 are set on the diagonal line on the upper right-hand side in the image plane, focus detection areas ALX21 and ALX22 are set on the diagonal line on the lower left-hand side in the image plane, and focus detection area ARX21 and ARX22 are set on the diagonal line on the lower right-hand side in the image plane. Further, the focus detection areas ALX11 and ALX12 are set on the diagonal line on the upper left-hand side in the image plane, focus detection areas AUH and AUV are set in the upper part of the image plane, and focus detection areas ADH and ADV are set in the lower part of the image plane. These cross type focus detection areas AUH, AUV, ADH, and ADV are set in the shorter side direction in the image plane on one straight line running through the center of the image line. The focus detection areas AUH and ADH are set in the longer side direction in the image plane and focus detection areas AUV and ADV are set in the shorter side direction in the image plane. Further, the focus detection areas ARX11, ARX22, ALX12, and ALX21 are set in the radial direction from the center of the image plane while the focus detection areas ARX12, ARX21, ALX11, and ALX22 are set in the direction of the contacting line of the center of the image plane and concentric circles. Also, the cross type focus detection areas ARX11, ARX12, ARX21, ARX22, ALX11, ALX12, and ALX21 and ALX22 are arranged between the locations from W1 (=WH/4) from the center of the image plane to W2 (=W/6) in the longer side direction in the image plane (here, WH is the length of the longer side direction in the image plane). Further, the cross type focus detection areas ARX11, ARX12, ARX21, ARX22, ALX11, ALX12, ALX21, ALX22, AUH, AUV, ADH, and ADV are set on the circumference of an ellipse in the center of the image plane, and the ratio between the major diameter and minor diameter of this ellipse is defined to be almost equal to the ratio between the vertical and horizontal lengths of the image plane.

Thus, by setting the cross type focus detection areas in the center of the image plane, on both of the diagonal lines and the center line in the longer side direction in the image plane, it is possible to perform focus detections assuredly for the principal object when an object is located at an optimal position in a photographing composition. Further, the six cross type focus detection areas are efficiently arranged in the image plane. It is therefore possible to perform focus detection for the face of a person assuredly when a portrait photography is taken at vertical and horizontal positions. Also, there is an increased probability to capture an object having slanting patterns with either one of the plural focus detection areas in the image plane. Each of the focus detection areas included in the three cross type focus detection areas of the six cross type focus detection areas is set so as not to be in parallel with each other. Hence enabling the performance of the focus detections for objective patterns of any angles.

Figure 42:
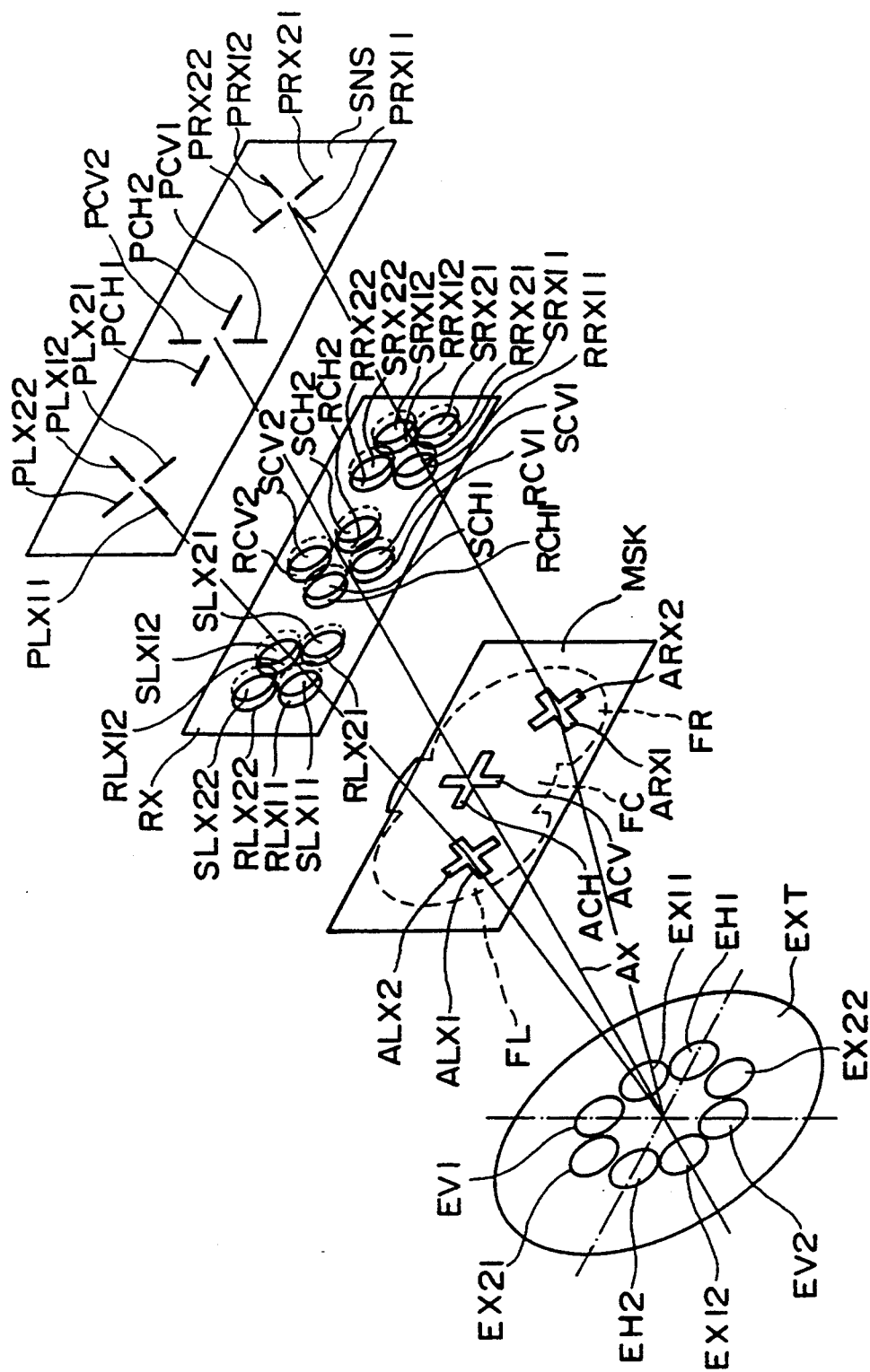
FIG. 42 is a view showing the structure of another embodiment of a focus detection operation system according to the present invention.

FIG. 42 is a view illustrating the structure of another embodiment of an focus detection apparatus according to the present invention. In this respect, the same reference marks are given to the same elements for the focus detection optical system shown in FIG. 12, and the description will be made mainly of the points which differ therefrom.

The focus detection areas ARX1, ARX2, ACH, ACV, ALX1, and ALX2 formed by each of the field mask MSK openings from the respective cross type focus detection areas with each other. The focus detection are ACH is set in the longer side direction in the center of the image plane. The focus detection area ACV is set in the shorter side direction in the image plane. The focus detection areas ARX1, ARX2, ALX1, and ALX2 are set at an angle of 45 degrees to the focus detection areas ACH and ACV in the locations away from the center of the image plane on the left-and right-hand sides in the longer side direction and above and below in the shorter side directions in the image plane.

If the focus detection optical system shown in FIG. 12 is applied as it is to the focus detection areas thus arranged, the condenser lenses, diaphragm masks, separator lenses and sensor are to be arranged behind each of the focus detection areas, and the light receiving portions on the sensor SNS for the focus detection areas ALX1, ALX2, ARX1, and ARX2 set on the left-hand and right-hand sides in the image plane should be arranged so that they are displaced in the same direction in accordance with the vertical displacement of these focus detection areas in the shorter side direction in the image plane. As a result, the light receiving portions PCH1, PCH2, PCV1, and PCV2 on the sensor SNS for the focus detection areas ACH and ACV set in the center of the image plane and the light receiving portions PLX11, PLX12, PLX21, PLX22, PRX11, PRX12, PRX21, and PRX22 on the sensor SNS for the focus detection areas ALX1, ALX2, ARX1 and ARX2 cannot be aligned on one straight line. Hence requiring a large size sensor chip and an increased manufacturing cost.

Therefore, as shown in FIG. 42, the optical axes of the condenser lenses FR and FL for the focus detection areas ALX1, ALX2, ARX1, and ARX2 set on the left-hand and right-hand sides in the image plane are displaced vertically in the shorter side direction for the centers of the respective focus detection areas (the intersection of each center line of the ARX1 and ARX2, and the intersection of each center line of the ALX1 and ALX2), and the optical axes of the focus detection optical systems for the left-hand and right-hand sides are deflected. In this way, the secondary objective images for the focus detection areas ALX1, ALX2, ARX1, and ARX2 set on the left-hand and right-hand sides in the image plane can be aligned on one straight line with the secondary objective images for the focus detection areas ACH and ACV set in the center of the image plane. As a result, on the sensor SNS, the light receiving portions PRX11, PRX12, PRX21, PRX22, PLX11, PLX12, PLX21, and PLX22 on the left-hand and right-hand sides in the image plane can be arranged on one straight line with the light receiving portions PCH1, PCH2, PCV1, and PCV2 for the focus detection areas in the center of the image plane. In this respect, the diaphragm openings, separator lenses for the focus detection areas on the left-hand and right-hand sides in the image plane are also arranged so that they are displaced vertically in the shorter side direction in the image plane on the optical axes deflected respectively by the condenser lenses FL and FR.

By constructing the focus detection optical system in this way, it is possible to align light receiving portion for each of the cross type focus detection areas on one straight line on the sensor SNS even when the three cross type detection areas are not arranged to be on one straight line. Thus, the sensor chip can be made compact for the implementation of the manufacturing cost reduction.

In the above-mentioned embodiment, the condenser lenses FC, FL and FR, field mask MSK, diaphragm mask RX and the separator lenses SCH1, SCH2, ALH1, ALH2, SRH1, SRH2, SLV1, SLV2, SRX11, SRX12, SRX21, SRX22, SCV1, SCV2, SLX11, SLX12, SLX21, and SLX22 constitute the focus detection optical systems, and the sensor SNS constitute the photoelectric converting device, respectively.

As described above, according to an embodiment of the present invention, the cross type focus detection area in which two strip type focus detection areas are provided to intersect at right angles is set in the center of the photographing image plane and in the location other than the center thereof and at the same time, each of the strip type focus detection areas included in the cross type focus detection areas in the locations other than the center of the image plane is set so as not to be in parallel with each of the strip type focus detection areas included in the cross type focus detection areas in the center of the image plane. It is therefore possible to perform focus detections for an object of any type of patterns because an object having slanting patterns can be captured by the focus detection areas in the locations other than the center of the image plane and an object having vertical and horizontal patterns can also be captured by the focus detection areas in the center of the image plane, respectively.

According to an embodiment of the present invention, there are provided a plurality of the cross type focus detection areas with two strip type focus detection areas being set to intersect at right angles in a photographing image plane and at the same time, each of the focus detection areas included in at least two cross type focus detection areas of these plural cross type focus detection areas is arranged so as not to be in parallel with each other. It is therefore possible to perform focus detections assuredly for objective patterns of any angles.

According to an embodiment of the present invention, there are provided three or more cross type focus detection areas with two strip type focus detection areas being set to intersect at right angles in a photographing image plane and these cross type focus detection areas are arranged so that they are not aligned on one straight line. It is therefore possible to perform focus detections by capturing an object assuredly irrespective of its photographing compositions.

Also, according to an embodiment of the present invention, the cross type focus detection areas are set in the location other than the center of the image plane. Hence increasing the probability to detect the focusing on the face of a person when a portrait photography is taken.

According to an embodiment of the present invention, there are provided four on more cross type focus detection areas with two strip type focus detection areas being set to intersect at right angles in a photographing image plane on both of the diagonal lines in the photographing image plane or on both of the vertical and horizontal center lines in the photographing image plane. It is therefore possible to perform focus detections assuredly for an principal object at any positions in the photographing image plane.

According to an embodiment of the present invention, three of more focus detection areas are set in the photographing image plane so that the center of each of the focus detection areas is not aligned on one straight line, and with the focus detection optical system, the objective images for the respective focus detection areas are refocused to align the centers of the corresponding secondary objective images for the respective focus detection areas substantially on one straight line on the photoelectric converting device. It is therefore possible to perform focus detections by complementing an object of any photographing compositions assuredly as well as to make the chip size of the photoelectric converting device smaller for the implementation of the cost reduction.

Also, according to an embodiment of the present invention, three or more focus detection areas are set in the photographing image plane so that the center of each of the focus detection areas is not aligned on one straight line, and by plural pairs of condenser lenses and a pair of separator lenses, the objective images for the respective focus detection areas are refocused to align the centers of the corresponding secondary objective images for the respective focus detection areas substantially on one straight line on the photoelectric converting device. It is therefore possible to obtain the same effects as in the aforesaid embodiment.

According to an embodiment of the present invention, while a plurality of focus detection areas are set in the center of the photographing image plane and in the locations other than the center of the image plane and at the same time, the pixel pitches and/or pixel widths of a pair of light receiving portions for the focus detection areas in the center of the photographing image plane and the pixel pitches and/or pixel widths of a pair of light receiving portions for the focus detection areas in the locations other than the center of the image plane are set to be relatively different. It is therefore possible to compensate the lowered optical capability in the locations other than the center of the image plane due to the asymmetry of the focus detection optical systems. Hence enabling the maintenance of the focus detection precision in the locations other than the center of the image plane at the same level as the precision of the center of the image plane.

Also, according to an embodiment of the present invention, the pixel pitches of a pair of light receiving portions for the focus detection areas in the location other than the center of the photographing image plane is defined to be finer than the pixel pitches of a pair of light receiving portions for the focus detection areas in the center of the photographing image plane. It is therefore possible to obtain the same effects as the above-mentioned embodiment.

Further, according to an embodiment of the present invention, the pixel widths of a pair of light receiving portions for the focus detection areas in the location other than the center of the photographing image plane is defined to be wider than the pixel widths of a pair of light receiving portions for the focus detection areas in the center of the photographing image plane. It is therefore possible to obtain the same effects as the above-mentioned embodiment.

According to an embodiment of the present invention, cross type focus detection areas are set in the locations other than the center of the image plane, and while one of the strip type focus detection areas of the cross type focus detection area is set on the radial direction from the center of the photographing image plane, the length of the strip type focus detection area set on this radial line is defined to be shorter than the length of the strip type focus detection area which intersects at right angles with this strip type focus detection area. It is therefore possible to compensate the lowered focus detection precision due to the distortion of the focus detection optical system and thereby to perform accurate focus detections in the cross type focus detection areas in the location other than the center of the image plane.

According to an embodiment of the present invention, cross type focus detection areas are set in the locations other than the center of the photographing image plane, and one of the strip type focus detection areas of the cross type detection area is set on the radial line from the center of the photographing image plane and at the same time, the pixel pitches and/or pixel widths of a pair of light receiving portions for the strip type focus detection area set on this radial line and the pixel pitches and/or pixel widths of a pair of light receiving portions for the strip type focus detection area which intersects at right angles with this strip type focus detection area are defined to be relatively different. It is therefore possible to compensate the lowered optical capability due to the asymmetry of the focus detection optical systems. Hence enabling the maintenance of the focus detection precision of the strip type focus detection area set on the radial line from the center of the image plane at the same level of the precision of the focus detection area which intersects at right angles therewith.

Also, according to an embodiment of the present invention, the pixel pitches of the light receiving portions for the strip type focus detection area set on the radial line from the center of the photographing image plane is defined to be finer than the pixel pitches of the light receiving portions for the strip type focus detection area which intersects at right angles with this strip type focus detection area. It is therefore possible to obtain the same effects as the above-mentioned embodiment.

Further, according to an embodiment of the present invention, the pixel widths of the light receiving portions for the strip type focus detection area set on the radial line from the center of the photographing image plane is defined to be wider than the pixel widths of the light receiving portions for the strip type focus detection area which intersects at right angles with this strip type focus detection area. It is therefore possible to obtain the same effects as the above-mentioned embodiment.

According to an embodiment of the present invention, focus detection areas are set on the radial lines from the center of the photographing image plane and the pixel pitches and/or pixel widths of one of the light receiving portion of a pair of light receiving portions for the focus detection areas and the pixel pitches and/or pixel widths of the other light receiving portion are defined to be relatively different. It is therefore possible to improve the focus detection precision of the focus detection areas on the radial lines from the center of the image plane.

According to an embodiment of the present invention, focus detection areas are set on the radial lines from the center of the photographing image plane in the locations other than the center of the photographing image plane, and the pixel pitches of a pair of light receiving portions respectively for the focus detection areas are set so as to correct the distortion of the secondary objective images refocused by the focus detection optical system. It is therefore possible to compensate the lowered focus detection precision due to the distortion of the focus detection optical system. Hence enabling the accurate focus detections in the locations other than the center of the image plane.

According to an embodiment of the present invention, a plurality of focus detection areas are set in the center of the photographing image plane and in the locations other than the center thereof, and the slanting angles of the pixels of a pair of light receiving portions for the focus detection areas set in the center of the photographing image plane and the slanting angles of a pair of light receiving portions for the focus detection areas set in the locations other than the center of the photographing image plane are defined to be relative different. It is therefore possible to compensate the lowered optical capability due to the asymmetry of the focus detection optical systems. Hence enabling the maintenance of the focus detection precision in the locations other than the center of the image plane at the same level as the precision in the center of the image plane.

What is claimed is:

1. A focus detection apparatus including:

photoelectric converting means for receiving through a focus detection optical system light beams passing a plurality of cross type focus detection areas each having two strip type focus detection areas set to intersect at right angles in a photographing image plane; and focus detection computing means for detecting the focus adjustment condition of a photographing optical system for each of said strip type focus detection areas on the basis of output signals from said photoelectric converting means, said cross type focus detection areas being set in the center of said photographing image plane and in locations other than the center thereof, each of the strip type focus detection areas included in said cross type focus detection areas set in the locations other than the center of said photographing image plane being arranged so as not to be in parallel with either of the strip type focus detection areas included in said cross type focus detection area set in the center of said photographing image plane, and said cross type focus detection area set in the center of said photographing image plane being placed side-by-side with said cross type focus detection areas set in the locations other than the center of said photographing image plane in a horizontal direction of said photographing image plane.

2. A focus detection apparatus according to claim 1, wherein an orientation of said cross type focus detection areas set in the locations other than the center of said photographing image plane is rotated through 45 degree in relation to an orientation of said cross type focus detection area set in the center of said photographing image plane.

3. A focus detection apparatus including:

photoelectric converting means for receiving through a focus detection optical system light beams passing a plurality of cross type focus detection areas each having two strip type focus detection areas set to intersect at right angles in a photographing image plane; and focus detection computing means for detecting the focus adjustment condition of a photographing optical system for each of said strip type focus detection areas on the basis of output signals from said photoelectric converting means, each of the strip type focus detection areas included in at least two cross type focus detection areas being arranged so as not to be in parallel with any other strip type focus detection area included in said at least two cross type focus detection areas, and said at least two cross type focus detection areas being placed side-by-side with one another in a horizontal direction of said photographing image plane.

4. A focus detection apparatus according to claim 3, wherein said photoelectric converting means receives through said focus detection optical system light beams passing at least three cross type focus detection areas each having two strip type focus detection areas set to intersect at right angles in said photographing image plane; and wherein said cross type focus detection areas are arranged so as not to be on one straight line.

5. A focus detection apparatus according to claim 4, wherein said cross type focus detection areas are set in locations other than the center of said photographing image plane.

6. A focus detection apparatus according to claim 3, wherein said photoelectric converting means receives through said focus detection optical system light beams passing at least four cross type focus detection areas each having two strip type focus detection areas set to intersect at right angles in said photographing image plane; and wherein said cross type focus detection areas are arranged on both of diagonal lines in said photographing image plane or on both of vertical and horizontal center lines of said photographing image plane.

7. A focus detection apparatus according to claim 3, wherein an orientation of at least one cross type focus detection area of said at least two cross type focus detection areas is rotated through 45 degrees in relation to an orientation of the other cross type focus detection areas of said at least two cross type focus detection areas.

8. A focus detection apparatus including:

a photographing lens for forming an objective image;

a focus detection optical system comprising an optical block corresponding to a cross type focus detection area having two strip type focus detection areas set to intersect at right angles, said cross type focus detection area being disposed in an off-center location in a photographing image plane, one of said strip type focus detection areas of said cross type focus detection area being aligned with a radial line from the center of the photographing image plane;

said optical block comprising a condenser lens positioned in the vicinity of an estimated focal plane of said photographing lens, a diaphragm mask positioned rearward of said condenser lens, said diaphragm mask having two pairs of openings, and two pairs of refocusing lenses positioned rearward of said diaphragm mask, said pairs of refocusing lenses re-forming two pairs of secondary images of the objective image formed by said photographing lens;

light receiving means comprising two pairs of light receiving portions which receive the two pairs of secondary images re-formed by said two pairs of refocusing lenses, for generating light intensity distribution signals representative of light intensity distributions of the secondary images, each light receiving portion being formed by a plurality of pixels, pixel pitches of a pair of light receiving portions corresponding to said one strip type focus detection area aligned with a radial line from the center of the photographing image plane and pixel pitches of a pair of light receiving portions corresponding to the other strip type focus detection area which intersects at right angles with the one strip type focus detection area aligned with the radial line from the center of the photographing image plane being relatively different; and focus state calculating means for calculating a focus state of said photographing lens in said two strip type focus detection areas on the basis of the light intensity distribution signals from the two pairs of light receiving portions of said light receiving means, wherein the pixel pitches of the light receiving portions for said one strip type focus detection area set on the radial line from the center of said photographing image plane are defined to be finer than the pixel pitches of the light receiving portions for said strip type focus detection area which intersects with said one strip focus detection area.

9. A focus detection apparatus including:

a photographing lens for forming an objective image;

a focus detection optical system comprising an optical block corresponding to a cross type focus detection area having two strip type focus detection areas set to intersect at right angles, said cross type focus detection area being disposed in an off-center location in a photographing image plane, one of said strip type focus detection areas of said cross type focus detection area being aligned with a radial line from the center of the photographing image plane;

said optical block comprising a condenser lens positioned in the vicinity of an estimated focal plane of said photographing lens, a diaphragm mask positioned rearward of said condenser lens, said diaphragm mask having two pairs of openings, and two pairs of refocusing lenses positioned rearward of said diaphragm mask, said pairs of refocusing lenses re-forming two pairs of secondary images of the objective image formed by said photographing lens;

light receiving means comprising two pairs of light receiving portions which receive the two pairs of secondary images re-formed by said two pairs of refocusing lenses, for generating light intensity distribution signals representative of light intensity distributions of the secondary images, each light receiving portion being formed by a plurality of pixels, pixel widths of a pair of light receiving portions corresponding to said one strip type focus detection area aligned with a radial line from the center of the photographing image plane and pixel widths of a pair of light receiving portions corresponding to the other strip type focus detection area which intersects at right angles with the one strip type focus detection area aligned with the radial line from the center of the photographing image plane being relatively different; and focus state calculating means for calculating a focus state of said photographing lens in said two strip type focus detection areas on the basis of the light intensity distribution signals from the two pairs of light receiving portions of said light receiving means, wherein the pixel widths of the light receiving portions for said one strip type focus detection area set on the radial line from the center of said photographing image plane are defined to be wider than the pixel widths of the light receiving portions for said strip type focus detection area which intersects with said one strip focus detection area.

10. A focus detection apparatus including:

a photographing lens for forming an objective image;

a focus detection optical system comprising a plurality of optical blocks corresponding to three or more strip type focus detection areas set in a photographing image plane, centers of said strip type focus detection areas being disposed so as not to be aligned with each other;

each of said optical blocks comprising a condenser lens positioned in the vicinity of an estimated focal plane of said photographing lens, a diaphragm mask positioned rearward of said condenser lens, said diaphragm mask having a pair of openings, and a pair of refocusing lenses positioned rearward of said diaphragm mask, said pair of refocusing lenses re-forming a pair of secondary images of the objective image formed by said photographing lens;

light receiving means comprising a plurality of pairs of light receiving portions, each pair of light receiving portions receiving a pair of secondary images re-formed by a pair of refocusing lenses, for generating a light intensity distribution signal representative of a light intensity distribution of the secondary images, said plurality of light receiving portions being formed on one semiconductor chip, centers of the light receiving portions of each pair being disposed substantially on a line; and focus state calculating means for calculating a focus state of said photographing lens in said strip type focus detection areas on the basis of the light intensity distribution signal from the plurality of pairs of light receiving portions of said light receiving means;

said focus detection optical system further comprising deflecting means for deflecting rays passing through at least one of said optical blocks so that centers of each pair of the secondary images which are not disposed on the line without said deflection means, are disposed on the line in accordance with the arrangement of the light receiving portions of said light receiving means.

11. A focus detection apparatus according to claim 10, wherein said deflecting means is formed by eccentricity of at least one of said condenser lenses.

12. A focus detection apparatus including:

a photographing lens for forming an objective image;

a focus detection optical system comprising a plurality of optical blocks corresponding to a plurality of strip type focus detection areas set in a photographing image plane, said plurality of strip type focus detection areas being disposed in center and off-center locations in the photographing image plane;

each optical block comprising a condenser lens positioned in the vicinity of an estimated focal plane of said photographing lens, a diaphragm mask positioned rearward of said condenser lens, said diaphragm mask having a pair of openings, and a pair of refocusing lenses positioned rearward of said diaphragm mask, said pair of refocusing lenses re-forming a pair of secondary images of the objective image formed by said photographing lens;

light receiving means comprising a plurality of pairs of light receiving portions, each pair of light receiving portions receiving a pair of secondary images re-formed by a pair of refocusing lenses, for generating a light intensity distribution signal representative of a light intensity distribution of the secondary images, each light receiving portion being formed by a plurality of pixels, pixel pitches and/or pixel widths of a pair of light receiving portions corresponding to the focus detection area set in the center of the photographing image plane and pixel pitches and/or pixel widths of a pair of light receiving portions corresponding to a focus detection area set in an off-center location of the photographing image plane being relatively different; and focus state calculating means for calculating a focus state of said photographing lens in said plurality of strip type focus detection areas on the basis of the light intensity distribution signals from the plurality of pairs of light receiving portions of said light receiving means.

13. A focus detection apparatus according to claim 12, wherein
the pixel pitches of a pair of light receiving portions for said focus detection area set in an off-center location of said photographing image plane are defined to be finer than the pixel pitches of a pair of light receiving portions for said focus detection area set in the center of said photographing image plane.

14. A focus detection apparatus according to claim 12, wherein
the pixel widths of a pair of light receiving portions for said focus detection area set in an off-center location of said photographing image plane are defined to be wider than the pixel widths of a pair of light receiving portions for said focus detection area set in the center of said photographing image plane.

15. A focus detection apparatus including:
a photographing lens for forming an objective image;
a focus detection optical system comprising an optical block corresponding to a cross type focus detection area having two strip type focus detection areas set to intersect at right angles, said cross type focus detection area being disposed in an off-center location in a photographing image plane, one of said strip type focus detection areas of said cross type focus detection area being aligned with a radial line from the center of the photographing image plane, and the length of the one strip type focus detection area aligned with the radial line being defined to be shorter than the length of the other strip type focus detection area which intersects at right angles with the one strip type focus detection area;
said optical block comprising a condenser lens positioned in the vicinity of an estimated focal plane of said photographing lens, a diaphragm mask positioned rearward of said condenser lens, said diaphragm mask having two pairs of openings, and two pairs of refocusing lenses positioned rearward of said diaphragm mask, said pairs of refocusing lenses re-forming two pairs of secondary images of the objective image formed by said photographing lens;
light receiving means comprising two pairs of light receiving portions which receive the two pairs of secondary images re-formed by said two pairs of refocusing lenses, for generating light intensity distribution signals representative of light intensity distributions of the secondary images; and focus state calculating means for calculating a focus state of said photographing lens in said two strip type focus detection areas on the basis of the light intensity distribution signals from the two pairs of light receiving portions of said light receiving means.

16. A focus detection apparatus including:
a photographing lens for forming an objective image;
a focus detection optical system comprising an optical block corresponding to a strip type focus detection area which is aligned with a radial line from the center of a photographing image plane in an off-center location of said photographing image plane;
said optical block comprising a condenser lens positioned in the vicinity of an estimated focal plane of said photographing lens, a diaphragm mask positioned rearward of said condenser lens, said diaphragm mask having a pair of openings, and a pair of refocusing lenses positioned rearward of said diaphragm mask, said pair of refocusing lenses re-forming a pair of secondary images of the objective image formed by said photographing lens;
light receiving means comprising a pair of light receiving portions which receive the pair of secondary images re-formed by said pair of refocusing lenses, for generating a light intensity distribution signal representative of a light intensity distribution of the secondary images, each light receiving portion being formed by a plurality of pixels, pixel pitches and/or pixel widths of one of the pair of light receiving portions and pixel pitches and/or pixel widths of the other of the pair of light receiving portions being relatively different; and
focus state calculating means for calculating a focus state of said photographing lens in said strip type focus detection area on the basis of the light intensity distribution signal from the pair of light receiving portions of said light receiving means.

17. A focus detection apparatus including:
a photographing lens for forming an objective image;
a focus detection optical system comprising an optical block corresponding to a strip type focus detection area which is aligned with a radial line from the center of a photographing image plane in an off-center location of said photographing image plane;
said optical block comprising a condenser lens positioned in the vicinity of an estimated focal plane of said photographing lens, a diaphragm mask positioned rearward of said condenser lens, said diaphragm mask having a pair of openings, and a pair of refocusing lenses positioned rearward of said diaphragm mask, said pair of refocusing lenses re-forming a pair of secondary images of the objective image formed by said photographing lens, a distortion performance of a secondary image formed by one of said refocusing lenses and a distortion performance of a secondary image formed by the other of said refocusing lenses being relatively different;
light receiving means comprising a pair of light receiving portions which receive the pair of secondary images re-formed by said pair of refocusing lenses, for generating a light intensity distribution signal representative of a light intensity distribution of the secondary images, each light receiving portion being formed by a plurality of pixels, pixel pitches of each light receiving portion differing in accordance with positions of the pixels to compensate the distortions of the secondary images which are received by each light receiving portion; and focus state calculating means for calculating a focus state of said photographing lens in said strip type focus detection area on the basis of the light intensity distribution signal from the pair of light receiving portions of said light receiving means.

18. A focus detection apparatus including:

a photographing lens for forming an objective image;

a focus detection optical system comprising a plurality of optical blocks corresponding to a plurality of strip type focus detection areas set in a photographing image plane, said plurality of strip type focus detection areas being disposed in center and off-center locations in the photographing image plane;

each optical block comprising a condenser lens positioned in the vicinity of an estimated focal plane of said photographing lens, a diaphragm mask positioned rearward of said condenser lens, said diaphragm mask having a pair of openings, and a pair of refocusing lenses positioned rearward of said diaphragm mask, said pair of refocusing lenses re-forming a pair of secondary images of the objective image formed by said photographing lens;

light receiving means comprising a plurality of pairs of light receiving portions, each pair of light receiving portions receiving a pair of secondary images re-formed by a pair of refocusing lenses, for generating a light intensity distribution signal representative of a light intensity distribution of the secondary images, each light receiving portion being formed by a plurality of pixels arranged along a corresponding line, pixels of a first pair of light receiving portions corresponding to the focus detection area set in the center of the photographing image plane being inclined at a predetermined angle with respect to the corresponding line of pixels and pixels of a second pair of light receiving portions corresponding to a focus detection area set in an off-center location of the photographing image plane being inclined at an angle other than said predetermined angle with respect to the corresponding line of pixels; and focus state calculating means for calculating a focus state of said photographing lens in said plurality of strip type focus detection areas on the basis of the light intensity distribution signals from the plurality of pairs of light receiving portions of said light receiving means.

19. A focus detection apparatus for an objective lens having an optical axis comprising:

a first focus detecting unit for converting a first object image formed by said objective lens to a first electrical output signal by sampling said first object image at a first spatial sampling pitch, said first object image being formed in a first focus detecting area including said optical axis, and for detecting the focus condition of said objective lens in said first focus detecting area on the basis of said first electrical output signal;

a second focus detecting unit for converting a second object image formed by said objective lens to a second electrical output signal by sampling said second object image at a second spatial sampling pitch, said second object image being formed in a second focus detecting area not including said optical axis, and said second spatial sampling pitch being defined to be finer than said first spatial sampling pitch, and for detecting the focus condition of said objective lens in said second focus detecting area on the basis of said second electrical output signal.

20. A focus detection apparatus for an objective lens having an optical axis, said focus detection apparatus having a cross type focus detecting area disposed in an off-axial location in a predetermined focal plane of said objective lens, comprising:

a first focus detecting means including a first pair of photoelectric arrays for receiving light passed through a first pair of portions defined in an exit pupil of said objective lens, said first pair of photoelectric arrays corresponding to a first strip type focus detecting area which is one strip type focus detecting area of said cross type focus detecting area and is aligned with a radial line from a point on said optical axis in said predetermined plane, and a first calculating means for calculating the focus condition of said objective lens in said first strip type focus detecting area on the basis of outputs of said first pair of photoelectric arrays;

a second focus detecting means including a second pair of photoelectric arrays for receiving light passed through a second pair of portions defined in said exit pupil of said objective lens, said second pair of photoelectric arrays corresponding to a second strip type focus detecting area which is the other strip type focus detecting area of said cross type focus detecting area and intersects at right angles with said first strip type focus detecting area, and a second calculating means for calculating the focus condition of said objective lens in said second strip type focus detecting area on the basis of outputs of said second pair of photoelectric arrays;

wherein the length of said first strip type focus detecting area is shorter than the length of said second strip type focus detecting area.

* * * * *